United States Patent [19]

Siegler

[11] Patent Number: 4,760,646

[45] Date of Patent: Aug. 2, 1988

[54] TREE PRUNER AND HEDGE TRIMMER

[76] Inventor: Frederick Siegler, 444 S. Citrus Ave., Los Angeles, Calif. 90036

[21] Appl. No.: 1,959

[22] Filed: Jan. 9, 1987

[51] Int. Cl.[4] .............................................. B27B 17/08
[52] U.S. Cl. .................................... 30/382; 30/296 R; 30/386
[58] Field of Search ...................... 30/296 R, 381–387, 30/123.4; 144/22

[56] References Cited

U.S. PATENT DOCUMENTS

| | | | |
|---|---|---|---|
| 2,703,928 | 3/1955 | Southwick | 30/386 |
| 3,949,475 | 4/1976 | Tokarz | 30/387 |
| 4,048,722 | 9/1977 | Howard | 30/386 |
| 4,193,193 | 3/1980 | Holzworth | 30/382 |
| 4,654,971 | 4/1987 | Fettes et al. | 30/383 |

Primary Examiner—Douglas D. Watts
Attorney, Agent, or Firm—John Joseph Hall

[57] ABSTRACT

A portable apparatus for pruning tree limbs or trimming hedges, including a cutting head having a hedge trimmer disc or carrier means for a chain bar having a chain saw provided with means for angular adjustment of said chain bar to an infinite plurality of rotary positions relative to said cutting head, said cutting head mounted at the top of a telescoping boom means containing a transmission means of adjustable length which provides intermittent rotary motion to the chain saw or hedge trimmer disc transmitted from a pulling force produced by manual operation or produced by a power source.

18 Claims, 11 Drawing Sheets

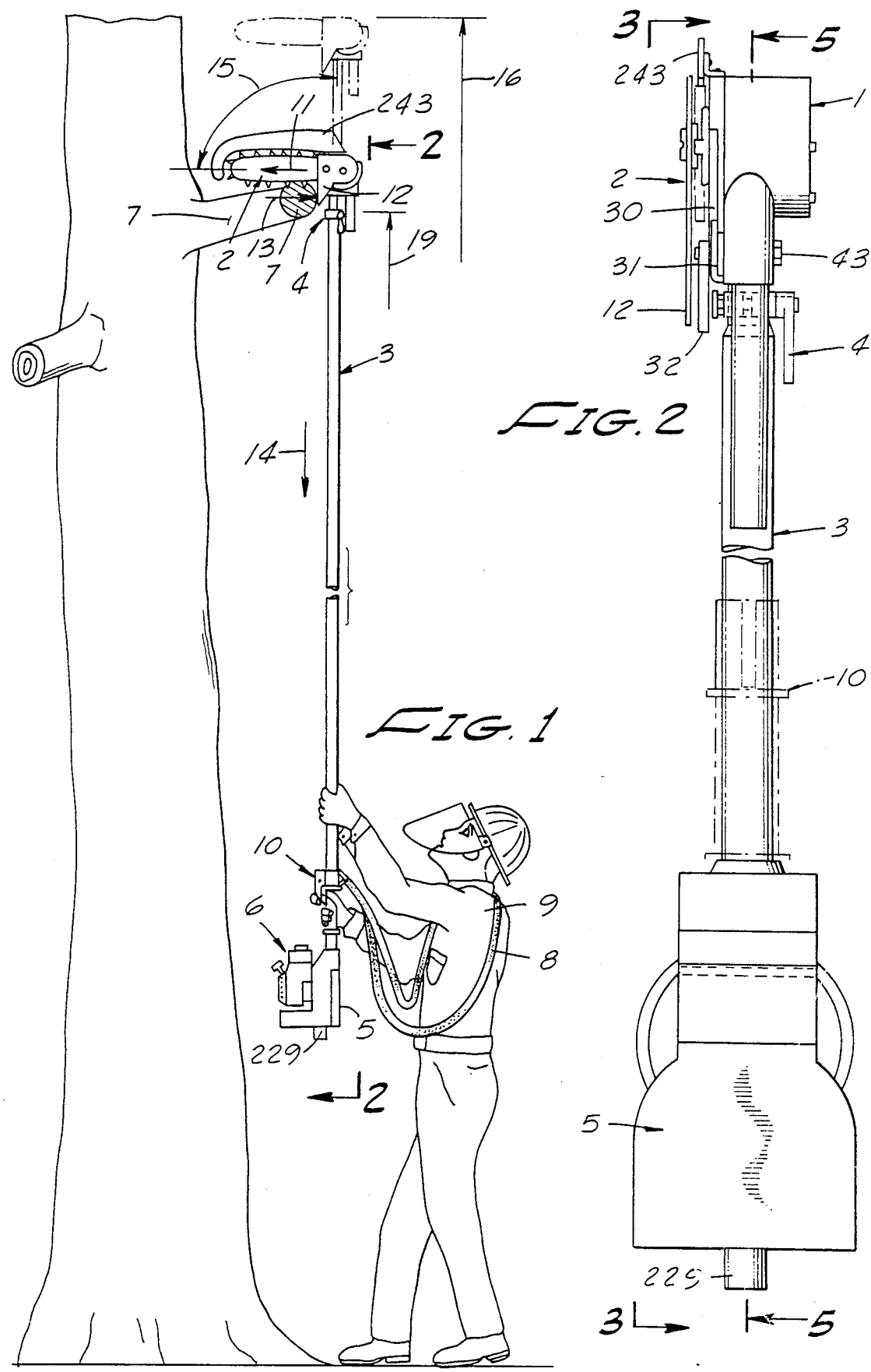

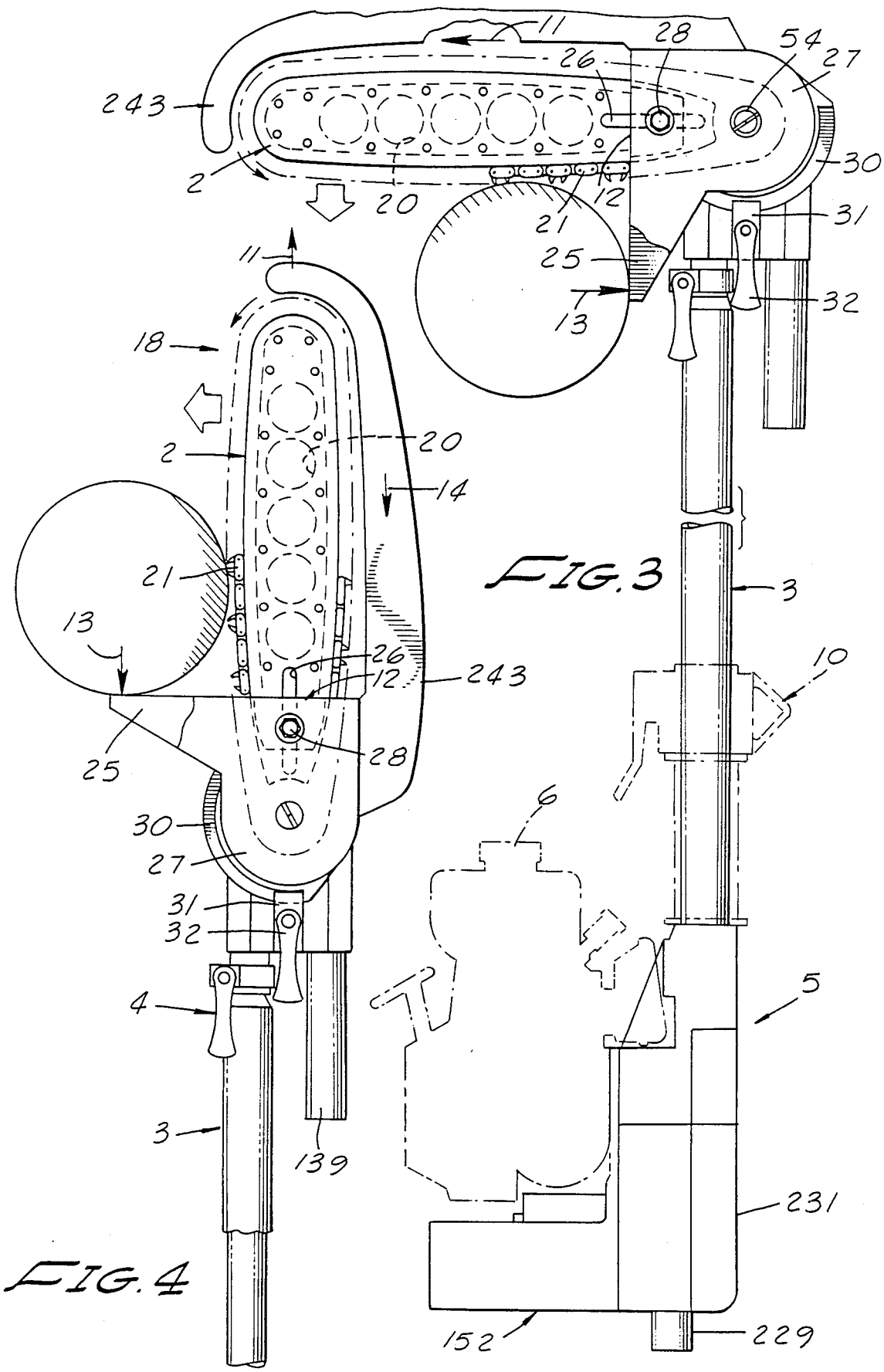

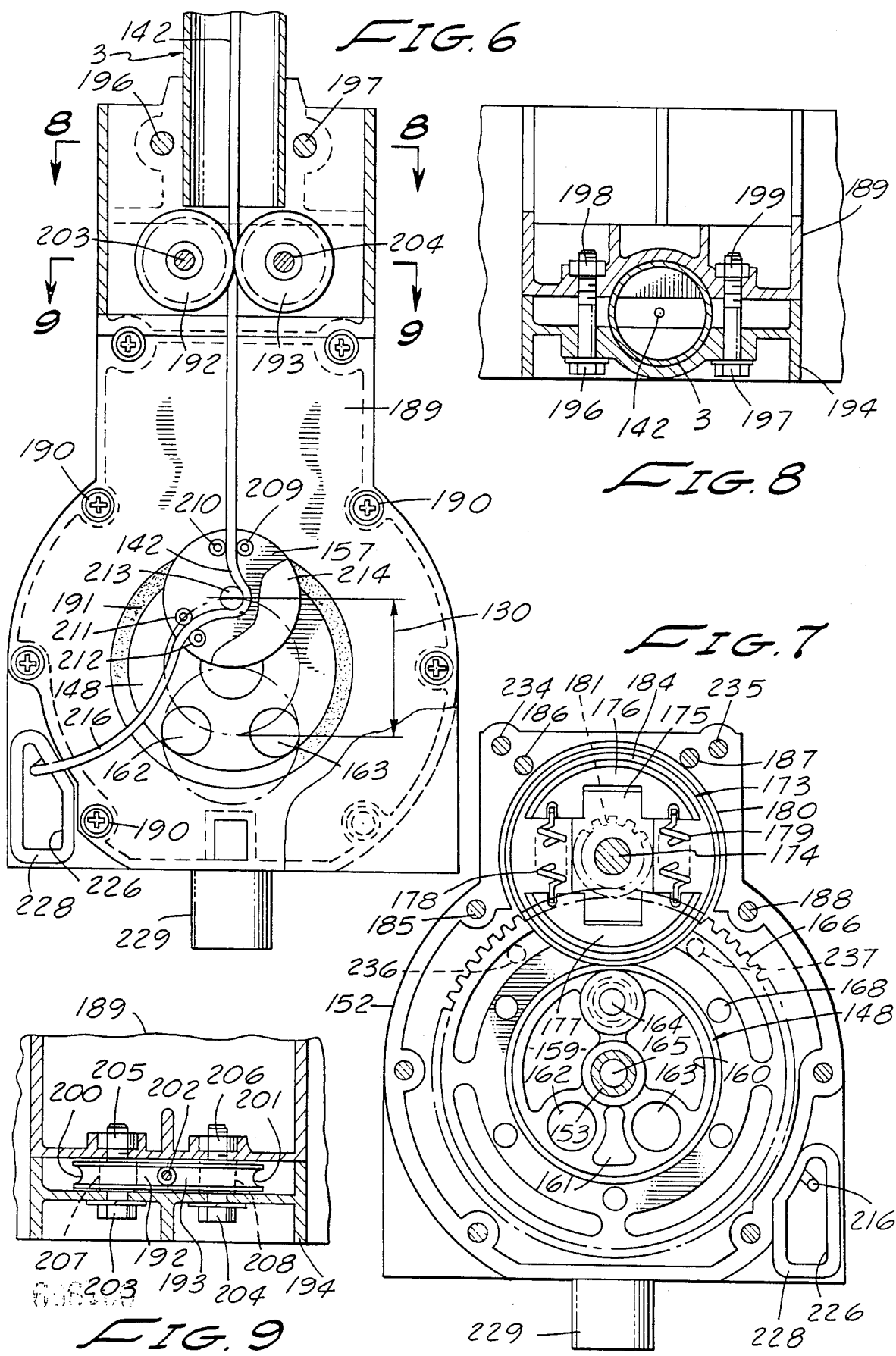

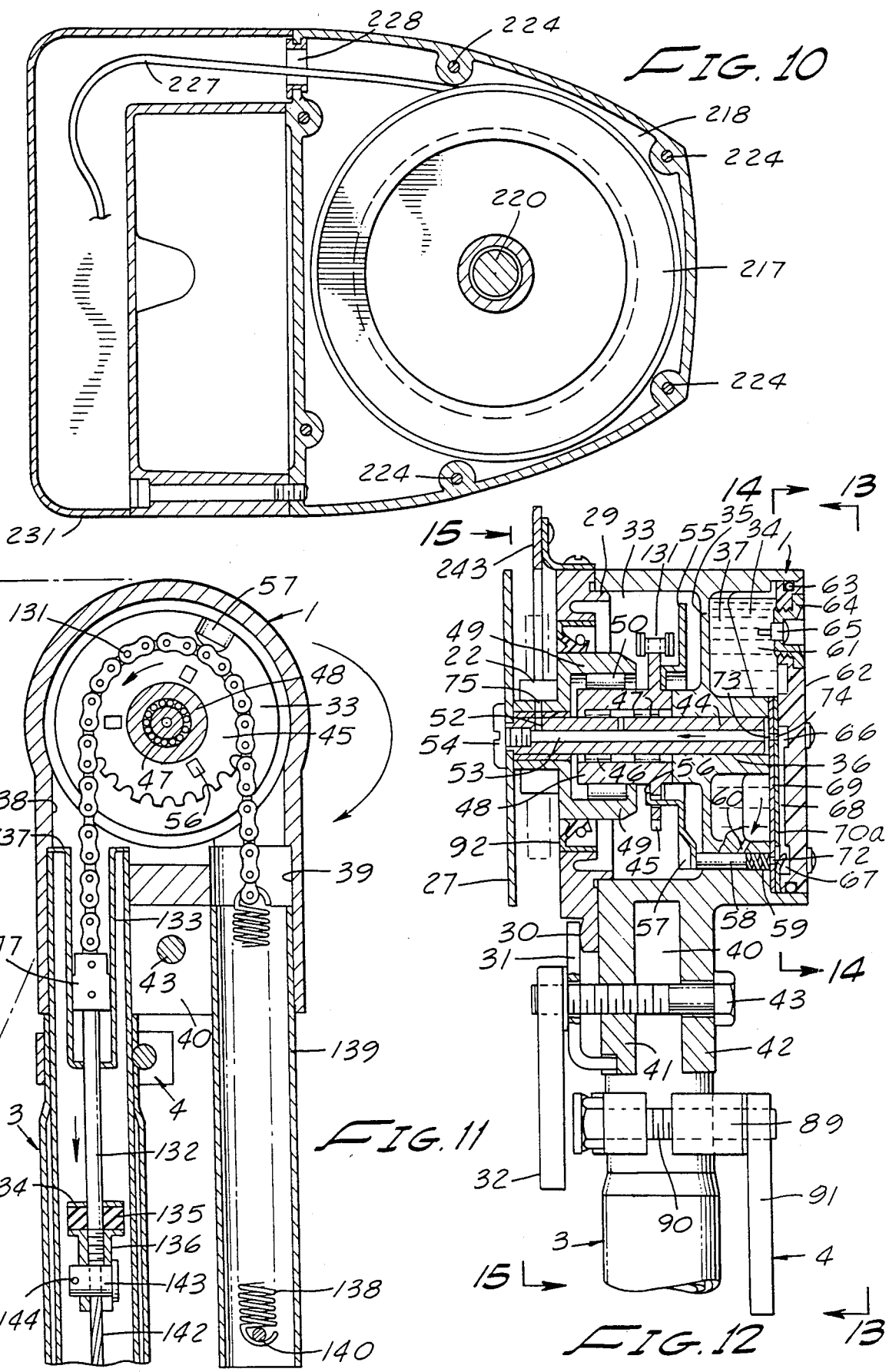

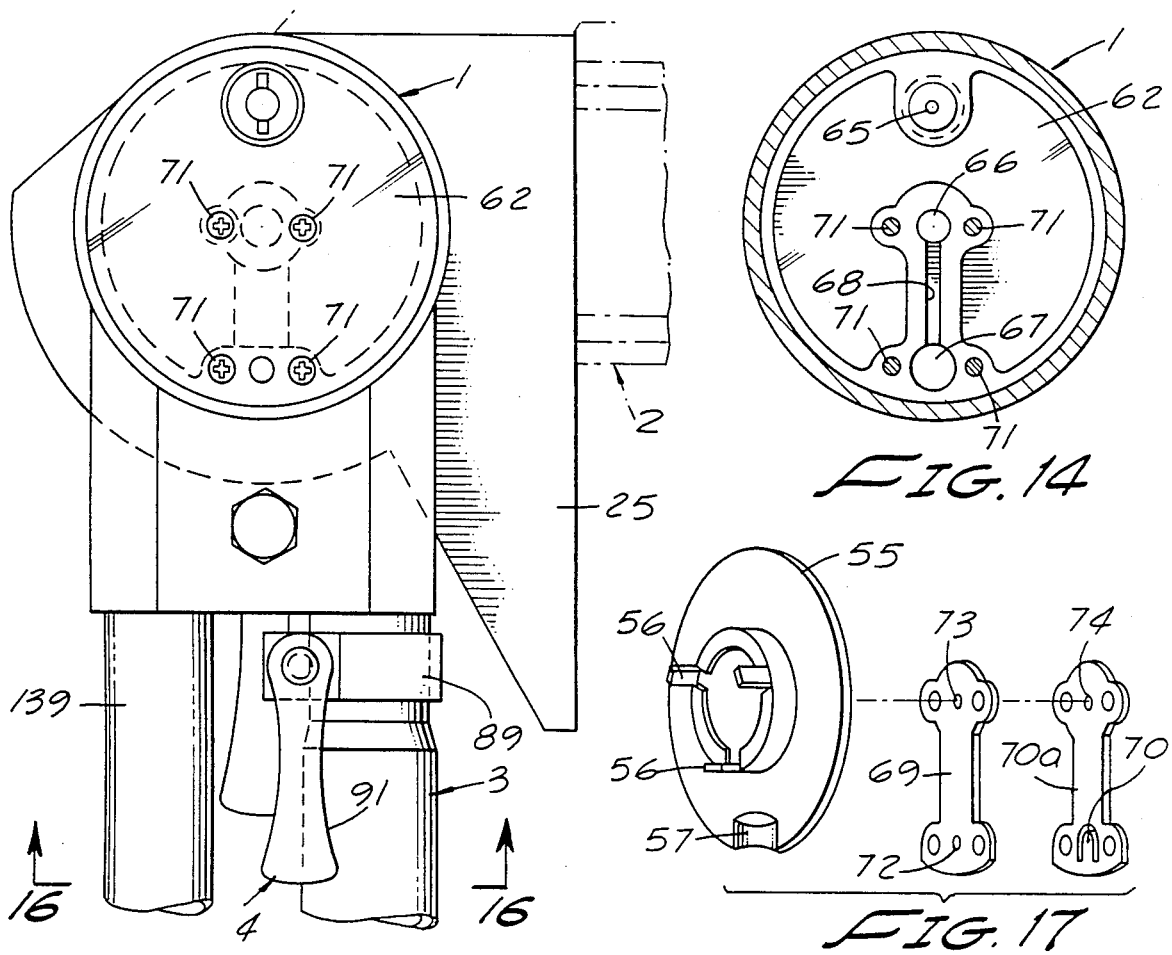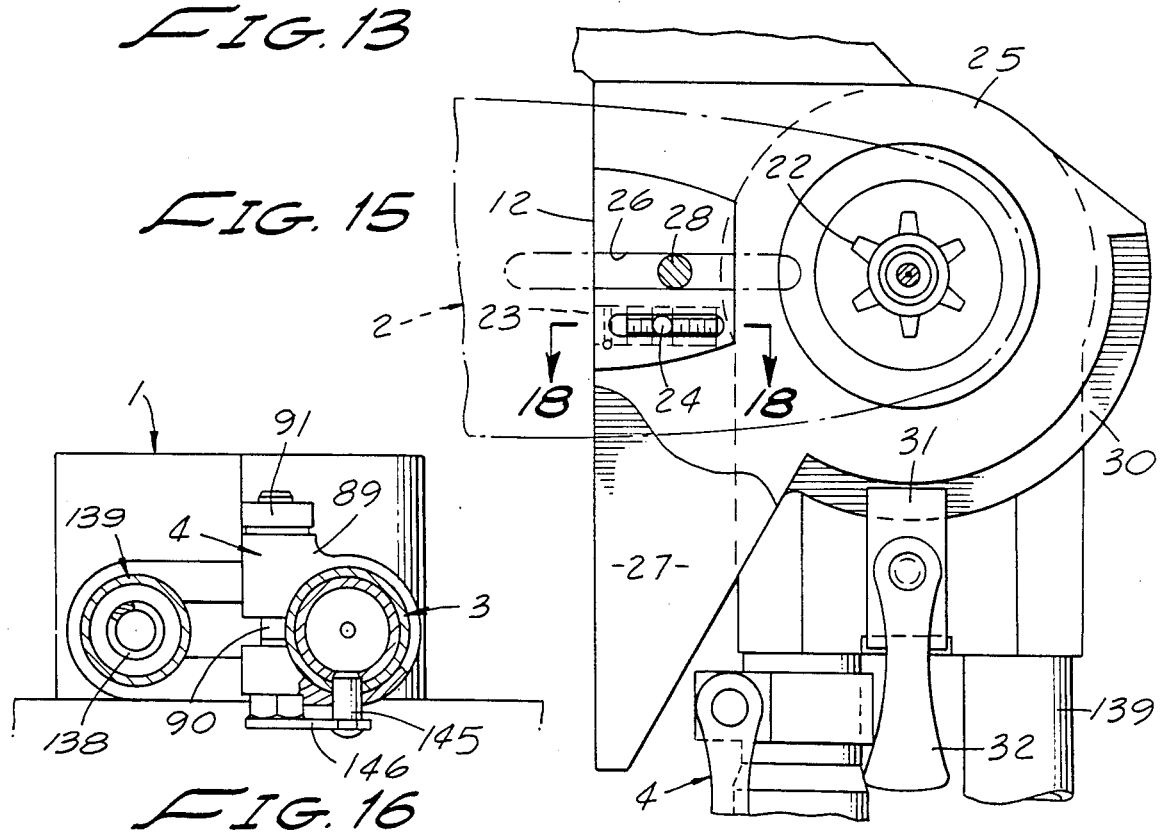

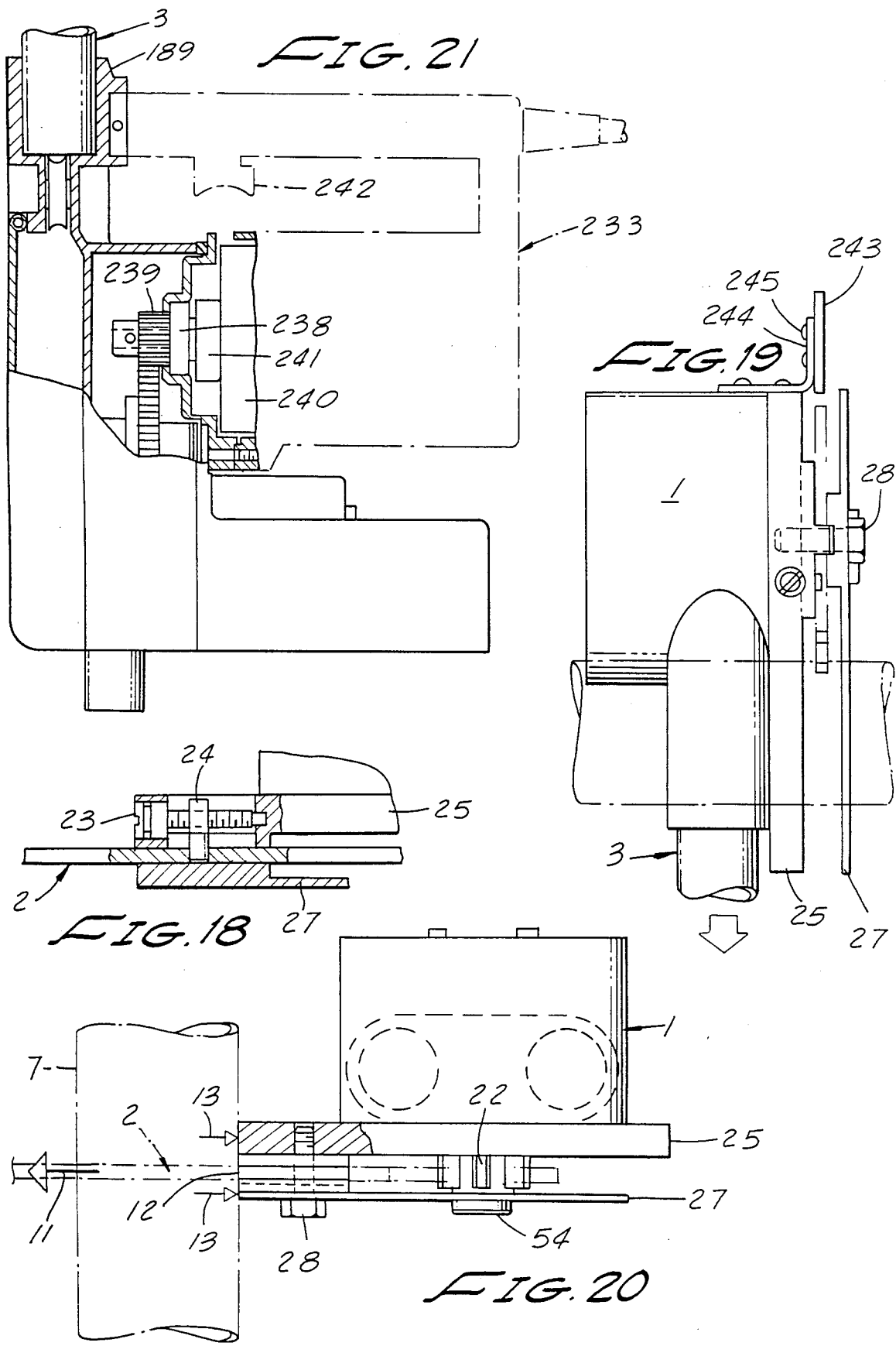

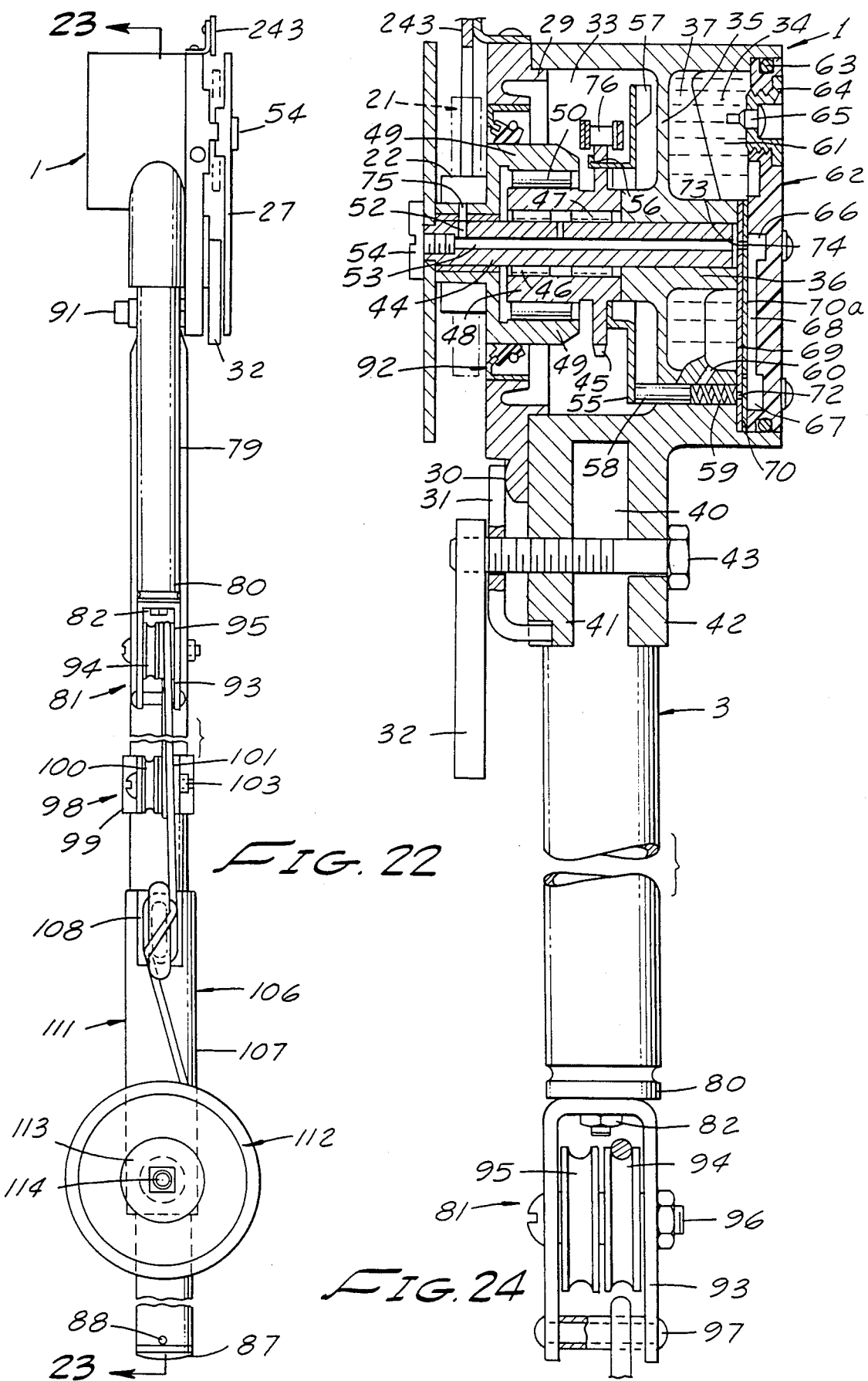

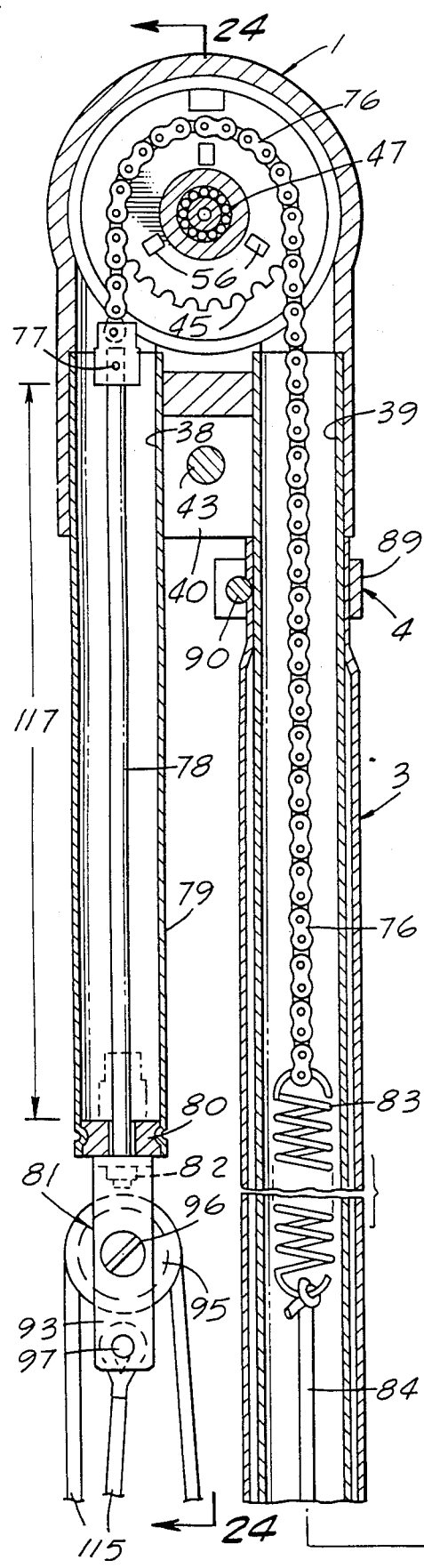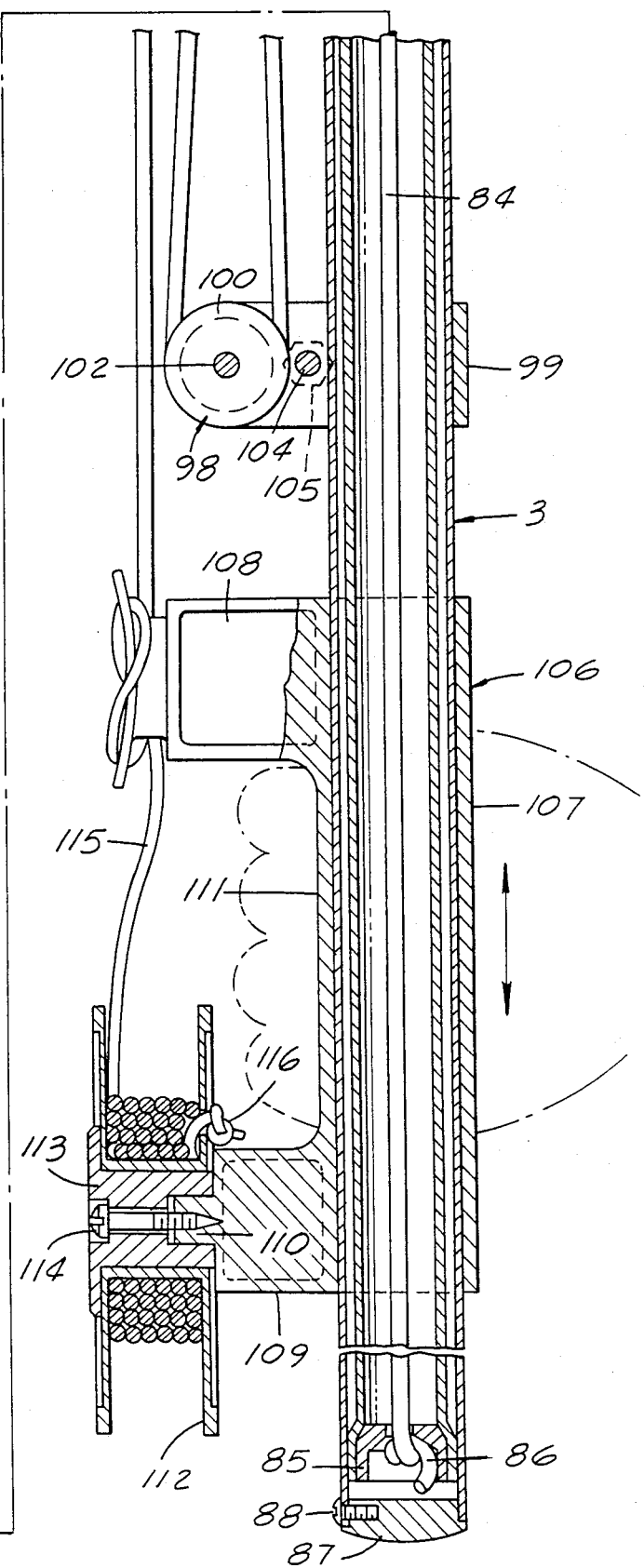
FIG. 23

TREE PRUNER AND HEDGE TRIMMER

BACKGROUND OF THE INVENTION

1. Field of the Invention

The present invention relates to mechanical tree pruning devices including chain saws and hedge trimmers, which have the capability of operating at unusual heights, 20 feet or more from the ground, and the cutting of unusally large tree limbs, up to 5½ inches in diameter, or more.

The novel design of the invention permits a plurality of several embodiments which are differently powered and can be built from the same principal components in different price ranges and for different market segments.

2. Description of the Prior Art

Numerous chain saw type devices exist in the prior art for the purpose of pruning tree limbs and trimming hedges, but they have serious disadvantages.

One such disadvantage is the lack of means for angular cutting head adjustment of the chain saw relative to the holding means, usually a pole of some sort. The capability of cutting head adjustment provides a better cutting angle and facilitates the location of the chain saw on top of the limb to be cut, thereby avoiding pinching of the saw during the cutting operation, which is usually at the side or bottom of the limb with prior art devices.

No means for angular cutting head adjustment is disclosed in U.S. Pat. Nos. 3,158,933 (Davis); 3,657,813 (Knight); 3,731,382 (Wroe); 4,048,722 (Howard); 4,122,601 (Katsuya); 4,179,805 (Yamada); 4,341,017 (Janczak); and 4,483,070 (Junkerman).

Another disadvantage of chain saw devices with pole members for pruning tree limbs is the absence of lubrication means for the chain saw. Of the devices disclosed in U.S. Pat. Nos. 2,703,928 (Southwick); 2,756,784 (Cherem); 3,158,933 (Davis); 3,657,813 (Knight); 4,048,722 (Howard); 4,122,601 (Katsuya); 4,179,805 (Yamada); and 4,483,070 (Junkerman), none has any means for lubrication of the chain saw at all.

U.S. Pat. No. 3,731,382 (Wroe) is limited to lubrication from its engine and requires a special lubrication line therefor, but has no means for lubrication for a manually operated tree pruner such as applicant's invention, or self-contained lubrication means provided by applicant's invention.

U.S. Pat. No. 4,341,017 (Janczak) provides lubrication of a chain saw but is limited to complicated means requiring a hydraulic pump, and an oil line extending along the length of the Janczak guide bar, and has no disclosure of a self contained lubrication means in the cutting head, such as in the present invention. Janczak is further limited by the absence of any means for adjusting the length of the guide bar.

U.S. Pat. No. 4,207,675 (Causey) discloses no means for lubrication of its cutting head element and is further limited to an electric motor as a power source.

Further, prior art devices using shaft driven transmission elements such as shaft bevel gear combinations and the like, are limited to a few feet in length because of the considerable torque required for operation of a chain saw, shaft windup, shaft whip, and excessive weight.

SUMMARY OF THE INVENTION

The present invention relates to a novel tree pruning and hedge trimmer design that has the capability of cutting tree limbs up to 5½" in diameter and more at unusual heights, up to 20 feet and more, from the ground.

The invention provides for a manually powered embodiment, a gasoline engine powered embodiment, and an electric motor powered embodiment, each made up of essentially the same basic components, other than the power source.

The basic design of the invention includes a telescoping boom with its top end supporting a cutting assembly and with its bottom end connected to a power source. The telescoping boom also guides or houses the power transmission element. The cutting assembly has a chain saw in the pruner embodiment. In the hedge trimmer embodiment, the cutting assembly has a blade assembly to trim tall hedges and tree leaves.

The unique cutting assembly design of the invention permits angular saw positioning relative to the telescoping boom at all angles, as desired. The infinite adjustment of the cutting assembly permits orientation of the saw element at right angles to the telescoping boom so that the tree limb may be cut from its top, thereby preventing pinching of the saw during the cutting operation.

The infinite adjustment of the cutting head permits any positioning of the saw to cut small limbs from the side or at any angle necessary for the cutting operation.

The weight of the tree pruner is sufficient to produce the radial cutting forces which direct the chain saw into the tree limb. However, the weight of the cutting head is considerably reduced by a plurality of lightening holes in the core of a conventional chain saw bar and the use of magnesium or other light weight metal alloys for the housing structure to facilitate handling.

Another novel and unique feature of the invention is a properly shaped stop member associated with the cutting assembly which permits cutting forces and reaction forces to cancel each other, thereby eliminating kick-back of the saw and feed-back forces to the operator.

The present invention has the capacity to operate and produce the torque necessary for a chain type saw over relatively long distances, up to 20 feet and more, by a high strength transmission element in tension. An embodiment of the invention provides this capability by the use of a braided wire rope connected to one end of a short roller chain supported by a roller chain sprocket and shaft, with the other end of the roller chain connected to a spring under tension.

Intermittent rotary chain saw motion is produced by connecting the roller chain sprocket to one element of a one-way clutch and the other element of the one-way clutch to the drive sprocket of the chain saw.

A pulling force on the wire rope generates large forces and sufficient chain torque to provide the required cutting power. Releasing the pulling force from the wire rope permits the spring on the other side of the roller chain to rewind the mechanism for the next power stroke.

During the spring rewind, the chain saw remains stationary and no cutting takes place because the spring force is small although large enough to cope with the acceleration forces of the mechanism. During the power stroke, most of the energy provides cutting power with only a small amount of the energy being consumed by tensioning the spring.

The length of the telescoping boom is adjustable to the working height desired of the pruner or hedge trimmer by letting one tube slide inside the other and clamping it in place by a suitable clamping device such as a hose clamp. The outer tube may be slit to provide maximum clamping effect. The clamping device includes a positive interlock pin between the outer and inner tubes to prevent any slip from developing between them which may reduce or completely eliminate the actuating stroke.

The telescoping boom provides a passage for the power transmission element, protects the transmission element from damage, and shields the operator from moving parts.

The transmission element is similarly adjustable in length as the telescoping boom, and the invention provides such an adjustment so that only the desired length is functional while the remaining portion of the transmission element is stored until the setting of a different length.

The invention has a special and unique capacity for automatic lubrication of the chain saw by providing the cutting assembly with a self-contained automatic lubrication means. The lubrication is produced by the passage of oil through a bore inside the stationary shaft supporting the chain saw sprocket and chain. Automatic lubrication is provided by a small pump actuated by each wire rope stroke to meter oil from a reservoir integral with the cutting assembly.

The present invention provides an embodiment which permits attachment of a unique rotary hedge trimmer blade to the chain saw drive sprocket in place of the chain saw. The rotary hedge trimmer blade is formed with a plurality of curved cutting edges and is provided with saw teeth arranged on the periphery of the blade between the cutting edges.

The interaction between the rotary hedge trimmer blade and a stationary blade attached to the housing of the cutting edge provides an efficient shear to trim hedges and small twigs.

The cutting head mechanism of the invention can be operated from a manual source, or a gasoline engine power source, or an electric motor power source, with only relatively minor modifications of the components of the invention, depending upon the particular source of power.

For manual operation of the invention, a long power stroke is necessary and preferred and is provided by relocating the telescoping boom in the cutting head and housing a long rewind spring inside the telescoping boom. A considerable and adequately long power stroke is provided by manually moving up and down a slide member having an actuating rope attached to it as a power transmission element. The slide member is mounted on the outside portion of the telescoping boom.

The length of the actuating rope is adjustable to follow adjustments of the telescoping boom by attaching the free end of the rope to a lock and winding the excess length of the actuating rope on a take-up reel associated with the slide member.

The invention incorporates the various pulley assemblies to obtain mechanical advantage for the cutting operation.

For operation of the invention by a power source, either an electric motor or a gasoline engine, and a braided wire actuating rope is used. Rotary motion generated by the power source produces reciprocating motion of the cutting head by attaching the end of the actuating wire rope to a shaft which is rotatable and mounted off center to a rotating driven cylinder.

The actuating wire rope is securely attached without slip to the end of the rotatable shaft of the rotating driven cylinder to prevent loss of effective strokes.

Such a secure attachment is provided by looping the actuating wire rope around the central post of the rotatable shaft and between securing pins fastened to the end of the rotatable shaft. Further security is provided by locating or sandwiching the actuating wire rope between clamping members forced together by a clamping nut member and arranged around the central post.

The functional length of the wire rope can be adjusted to any desired length without limiting the total wire rope length. The free length of the wire rope is stored on a reel located close to the clamp location of the wire rope but sufficiently far to permit free rope motion between the reel and the clamp orbiting wire rope end.

The management of the wire rope is best accomplished by the reel being spring rewound to automatically take up or release the length of the wire rope as the telescoping boom is adjusted.

The rotating driven cylinder is preferably driven by a gear reduction means to gain mechanical advantage. Weights properly located in the rotating driven cylinder provide convenience and easy static and dynamic balance.

Non-lubricated plastic gears and bushings can carry the required load of the invention.

The drive mechanism of the invention can be attached with only relatively minor modifications, such as adding an adapter flange, to various different power sources, electric or gasoline.

To minimize manufacturing tolerance accumulation problems affecting the gear drive, the drive and driven gears are preferably located in a main structure within one part of the overall housing of the invention. The other part of the housing may be attached to the telescoping boom to be mounted to the former at low cost and without tight tolerance requirements.

A pair of guide rollers jointly fastened to the main structure provides a circular hold which is an effective rope guide with maximum rope control without rope friction or wear.

The controls of a power source are preferably mounted on the telescoping boom.

For safety, a hinged guard is provided to cover the drive end of the wire rope, thereby preventing injury to the operator or to others while the invention is in operation, but still permitting access to rope length adjustment.

Further, invention provides a novel and unique safety features comprising a top chain guard member located above the chain saw and secured to the chain bar carrier. This safety feature prevents kickback of the chain bar should the invention be improperly operated.

An additional novel and unique safety feature can be included in the invention to prevent operation of the device should the top chain guard be removed.

In this modification, the top chain guard is provided with chain tensioning means to control chain tension of the cutter chain. If the top chain guard is removed, the chain tensioning means will also be removed, so that cutting action of the invention would be prevented, thereby rendering the invention inoperable.

A suitable rubber bumper may be attached to the bottom of the drive structures to facilitate handling of the invention and also to protect it. A shoulder strap is preferably attached to the telescoping boom as a weight support and to make both hands of the operator available for better control and manipulation of the invention.

OBJECTS OF THE INVENTION

It is, therefore, an object of this invention to provide a chain saw tree pruner and hedge trimmer capable of tree pruning and hedge trimming at heights of 20 feet or more from the ground.

Another object of this invention is to provide a chain saw tree pruner capable of cutting tree limbs of up to 5½ inches in diameter.

A further object of this invention is to provide a chain saw tree pruner with means for infinite angular adjustment of the chain saw relative to the holding means so that tree limbs may be cut from any angle, including the top of the tree limb.

Yet another object of this invention is to provide a chain saw tree pruner with self-contained automatic lubrication means for the chain saw in the cutting assembly.

Yet a further object of this invention is to provide a chain saw tree pruner with stop means to prevent kickback of the saw or feedback forces to the operator.

Still another object of the invention is to provide a chain saw tree pruner with the capability of producing relatively high torque for the operation of a chain saw over relatively long distances from the ground.

A still further object of this invention is to provide intermittent unidirectional rotary chain saw motion from a rotary power source.

A yet further object of this invention is to provide a chain saw tree pruner and hedge trimmer with an adjustable telescopic boom means connected to and molding the cutter assembly and capable of being extended to a length of 20 feet or more and providing a passage for a power transmission element adjustable in length to correspond to the adjusted length of the telescoping boom.

Another object of this invention is to provide a chain saw tree pruner and hedge trimmer which can be manually operated, or power operated, with only relatively minor modifications of the component parts.

A yet further object of this invention is to provide a chain saw tree pruner which has safety means to prevent saw kickback, comprising a top chain guard member located above the chain saw and secured to the chain bar carrier.

A still further object of this invention is to provide a chain saw tree pruner with fool proof safety means to prevent operation of the pruner should the top chain guard member be removed by removing chain tensioning means together with the top chain guard member.

These and other objects can be more readily understood by reference to the following description and accompanying drawings, in which FIG. 1 is a side elevational view illustrating an embodiment of the invention with a power source in operation.

FIG. 2 is a front elevational view taken on lines 2—2 of FIG. 1 of an embodiment of the invention.

FIG. 3 is a side elevational view taken on lines 3—3 of FIG. 2 illustrating the horizontal cutting position of a cutting head of an embodiment of the invention.

FIG. 4 is a side elevational view illustrating the vertical cutting position of the cutting head of an embodiment of the invention.

FIG. 6 is a front sectional view taken on lines 6—6 of FIG. 5.

FIG. 7 is a rear sectional view taken on lines 7—7 of FIG. 5.

FIG. 8 is a top plan cross sectional view taken on lines 8—8 of FIG. 6.

FIG. 9 is a top plan cross sectional view taken on lines 9—9 of FIG. 6.

FIG. 10 is a top plan cross sectional view taken on lines 10—10 of FIG. 5.

FIG. 11 is a side elevational cross section positional view illustrating reciprocating motion of an embodiment of the invention.

FIG. 12 is a side elevation cross section view taken on lines 12—12 of FIG. 5.

FIG. 13 is a rear elevational view taken on lines 13—13 of FIG. 12.

FIG. 14 is a front cross sectional view taken on lines 14—14 of FIG. 12.

FIG. 15 is a side elevational view of a cutting head illustrating tensioning means for a chain saw of an embodiment of the invention.

FIG. 16 is a bottom cross sectional view taken on lines 16—16 of FIG. 13.

FIG. 17 is an exploded perspective view of a valve assembly for an embodiment of the invention.

FIG. 18 is a top plan cross sectional view taken on lines 18—18 of FIG. 15.

FIG. 19 is a rear elevational view of the cutting head of an embodiment of the invention in a cutting mode.

FIG. 20 is a top plan view of the cutting head of an embodiment of the invention in a cutting mode.

FIG. 21 is a side elevational view illustrating another embodiment of the invention having a power source.

FIG. 22 is a rear elevational view of a manually operated embodiment of the invention.

FIG. 23 is a side elevational view taken on lines 23—23 of FIG. 22.

FIG. 24 is a side elevational cross sectional view taken on lines 24—24 of FIG. 23.

DETAILED DESCRIPTION OF PREFERRED EMBODIMENTS OF THE INVENTION

Figure 5:
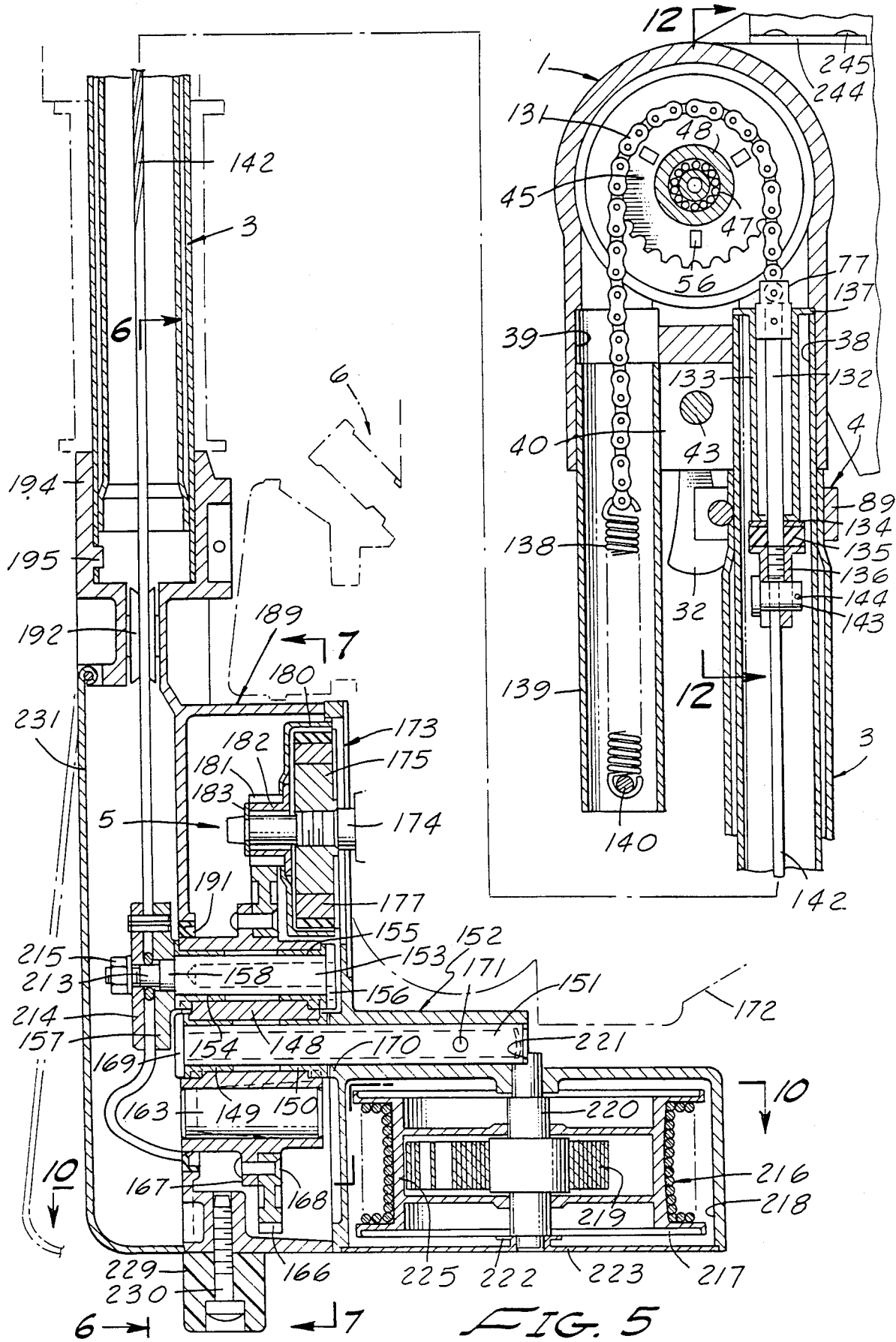
FIG. 5 is a side elevational cross sectional view taken lines 5—5 of FIG. 2.
Figure 25:
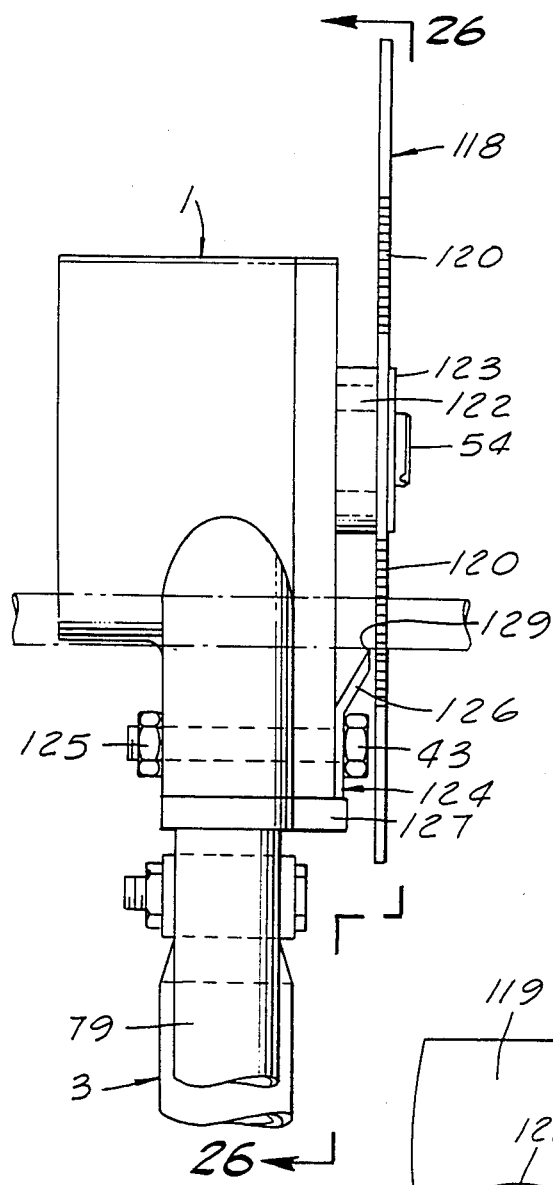
FIG. 25 is a rear elevational view of an embodiment of the invention having a hedge trimmer blade.
Figure 27:
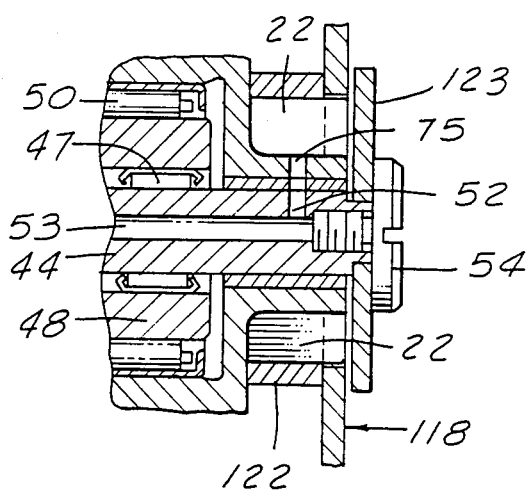
FIG. 27 is a side elevational cross sectional view taken on lines 27—27 of FIG. 26.
Figure 26:
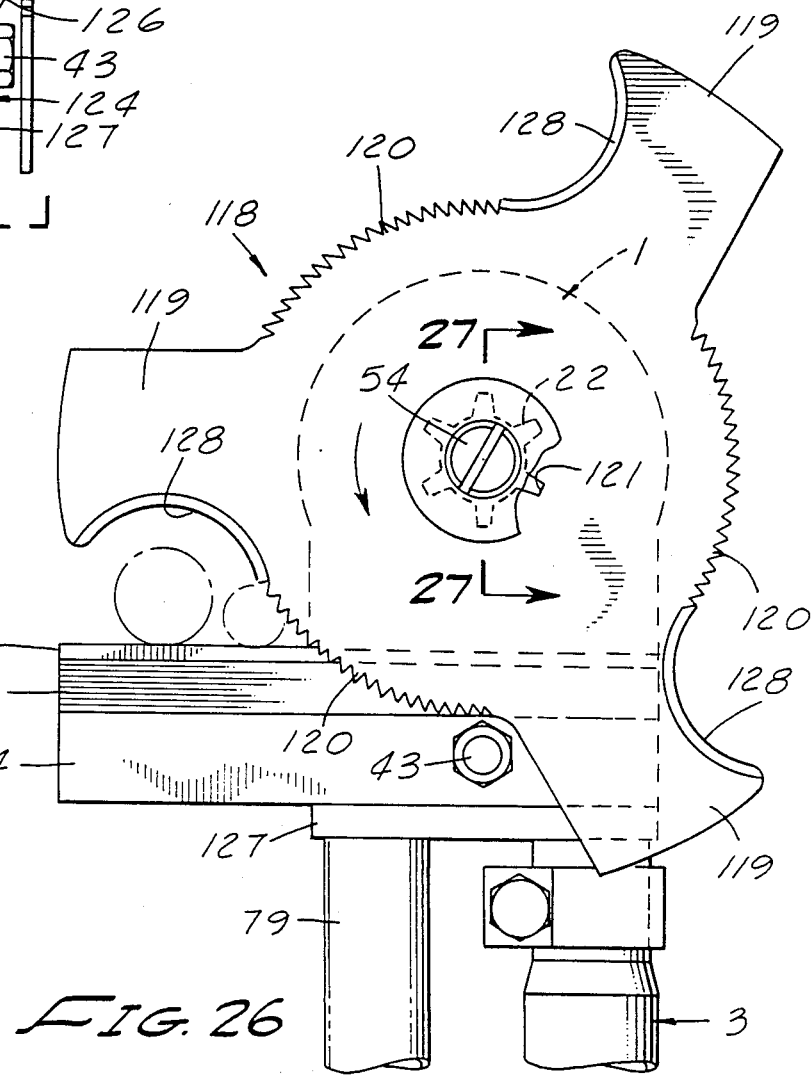
FIG. 26 is a side elevational view taken on lines 26—26 of FIG. 25.
Figure 28:
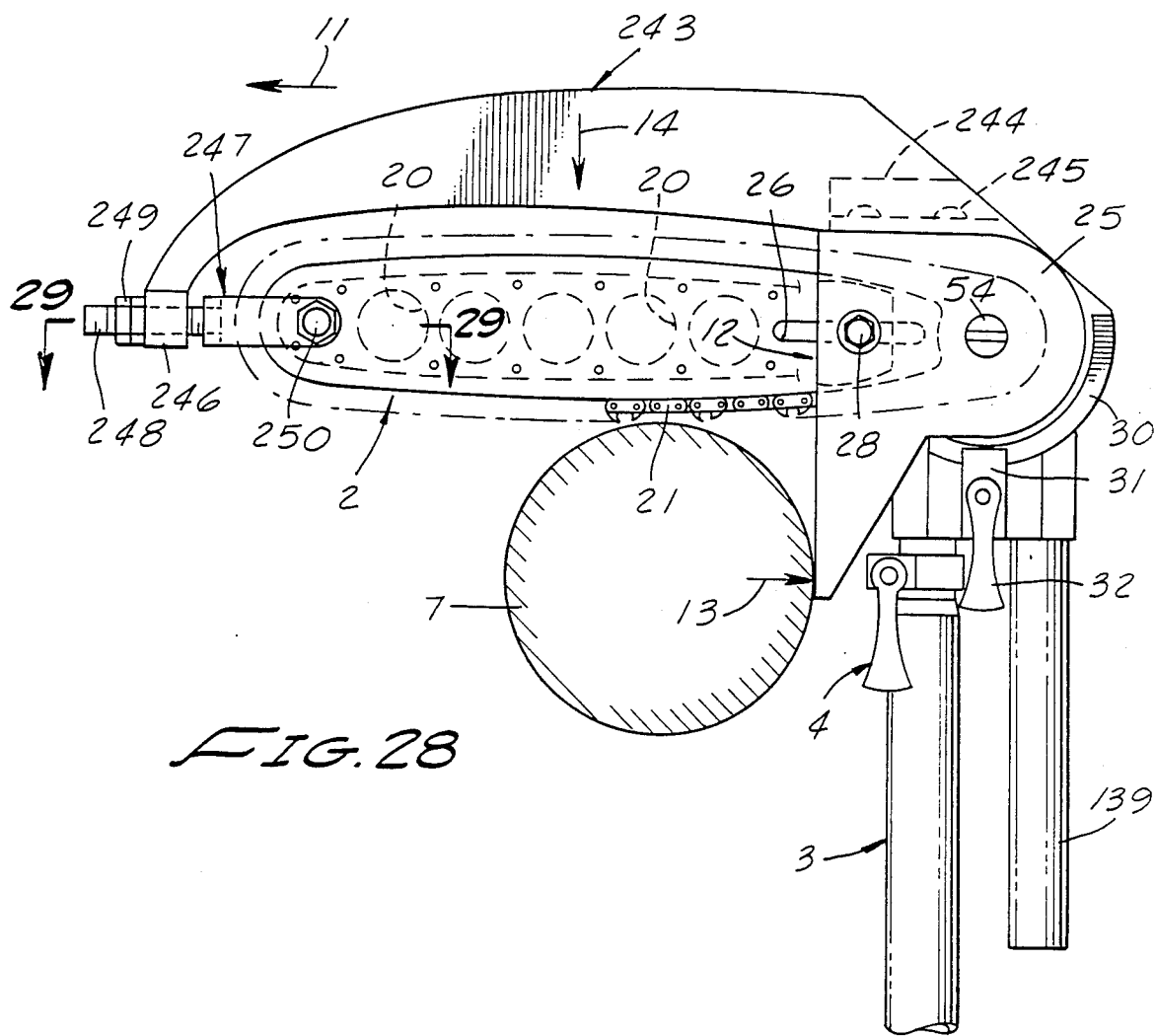
FIG. 28 is a side elevational view of an embodiment of the invention provided with a safety guard for the chain saw.
Figure 29:
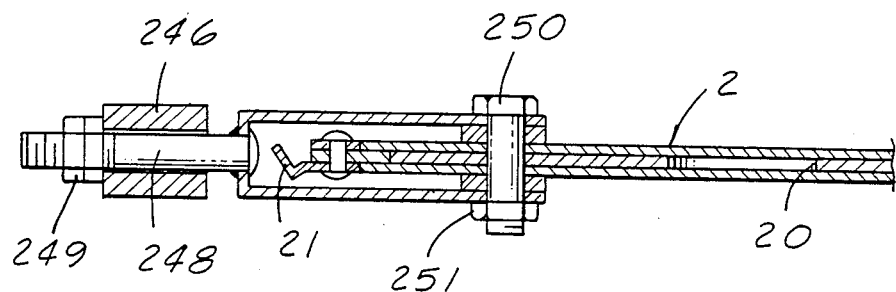
FIG. 29 is a top plan cross sectional view taken on lines 29—29 of FIG. 28.

A preferred embodiment of the invention is shown in FIG. 1, which depicts an operator with a gasoline driven pruning saw configuration in operating position preliminary to cutting a tree limb.

A preferred embodiment of the invention has a cutting head 1 provided with a chain bar 2. Cutting head 1 is attached at one end to the top portion of telescoping boom 3 which is locked into position by clamp 4.

The bottom portion of telescoping boom 3 is attached to power head 5 which is connected to a power source 6, which, in this embodiment, is a gasoline engine.

Before the mechanical pruner of the invention is positioned for cutting tree limb 7, a shoulder strap 8 is placed over the shoulder of the operator 9 to support the pruner and to leave the operator's hands free for maneuvering.

Power head 5 and power source 6 are connected by a centrifugal clutch 173 through a transmission member 142 located inside the telescoping boom 3.

Engine control 10 provides a increase in engine speed as desired after the pruner is in place and the power source 6 is started for cutting.

Power head 1 transfers power to the cutting chain 21 guided by chain bar 2 and thereby starts the cutting operation.

Cutting forces are indicated at 11, and tend to pull chain bar 2 and the whole pruner in one direction, but are prevented from doing so by a blocking member 12 in contact with the tree limb 7 due to its generation of an equal but opposite reaction force indicated as 13.

Force 11 and force 13 cancel each out so that cutting head 1 remains stationary, but the action of force 11 is free to cut tree limb 7 as the whole pruner moves downwardly due to its own weight 14.

Although the physical relation of chain bar 2 to telescoping boom 3 is typically at a right angle 15, the invention permits infinite angle adjustments within defined design limits. Beginning the cutting operation with a right angle 15 relation on top of the tree limb 7 insures that the cut opens from the top of the tree limb 7 due to the overhanging tree limb weight. As the cut deepens and widens, each side of the cut moves further away from chain bar 2 so that no pinching can occur of chain bar 2 during the cutting operation.

In this way, the invention prevents the pinching that occurs with conventional devices that produce side cuts or bottom cuts which pinch the chain saw, thus blocking cutting action and locking the device to the tree limb before the cutting operation is finished.

The telescopic boom 3 has an extended length 16 which can be adjusted to 20 feet or more as desired and is not limited in length by operating principles.

Tree limbs capable of being cut by the invention can have a branch diameter of up to 5.5 inches or more, depending on chain bar lengths, available power, or acceptable weight of the invention, but is not limited by the operating principles of the invention.

Cutting head 1 remains operational at any selected angle, including a straight position 18, to make side cuts in small limbs without consequences from pinching. Thus, the invention is not limited to a right angle 15 relationship but has the capability of cutting tree limbs growing in various ways, shapes, and directions.

The telescoping boom 3 is not limited to two elements but may be made of several parts to optimize storage dimensions 19 or extended length 16.

Cutting head 1 and power head 5 can be oriented to each other so that both are on the same side of the telescoping boom 3 as shown in FIG. 1, or they may be positioned on opposite sides of telescoping boom 3 to facilitate balance and human factors without adversely affecting the operation of the invention.

Chain bar 2 is of conventional configuration except for a number of weight-lightening holes 20 in its core plate to reduce the weight of cutting head 1.

Tension of cutting chain 21 is adjustable by moving chain bar 2 relative to drive sprocket 22 by means of adjusting screw 23 and adjusting pin 24 which is engaged into chain bar 2.

The relative position of chain bar 2 and chain bar carrier 25 is assured by guide 26. Chain bar 2 is located or sandwiched between chain bar carrier 25 and chain guard 27 and clamped in an adjusted position by screw 28.

Chain guard 27 has a shape essentially the same as that of chain bar carrier 25, both being provided with blocking member 12, so that reaction force 13 isequally shared by chain bar carrier 25 and chain guard 27.

Chain bar carrier 25 is rotatably piloted in cutting head 1 by pilot 29 which is concentric to drive sprocket 22 so that the adjusted chain tension is maintained regardless of the angular position of chain bar 2 relative to drive sprocket 22. Chain bar carrier 25 has a circular segment 30 which is located or sandwiched between yoke 31 and cutting head 1 so that infinite angular adjustment is permitted of chain bar 2 relative to cutting head 1 within the design range of circular segment 30. Chain bar carrier 25 and cutting head 1 are locked together at any angular position by yoke 31 and clamping nut or handle 32. Chain bar carrier 25 carries dust seal 92 and closes cylindrical cavity 33.

A preferred material for cutting head 1 is magnesium die casting for weight reduction, although other suitable materials may be used if they do not adversely affect the operation of the invention.

Cutting head 1 is formed with two cylindrical cavities 33 and 34 separated from each other by vertical wall 35 which supports a central hub 36 reinforced by radial rib 37. Cutting head 1 extends downwardly and contains two additional cylindrical cavities 38 and 39 both independently tangent and on opposite sides to cylindrical cavity 33 and in full communication with it.

Gap 40 interconnects cylindrical cavities 38 and 39 in the center. Walls 41 and 42 are connected by screw 43 which has a clearance hole in wall 42 and which is engaged in the threaded hole of wall 41. When screw 43 is tightened, the section of cutting head 1 that is weakened by gap 40 becomes an efficient clamp to retain telescoping boom 3 or other components as discussed hereafter. When screw 43 is tightened, its protruding portion serves also as the male member for clamping nut or handle 32.

Central hub 36 of cutting head 1 has a central hole into which pin 44 is pressed to become a stationary shaft and point of rotation for roller chain sprocket 45. Needle bearings 46 and 47 are pressed into the hub 48 of roller chain sprocket 45.

Drive sprocket 22 of cutting chain 21 has atubular extension 49 into which a one way roller clutch 50 is pressed. Any suitable one way roller clutch may be used, such as the type sold by Torrington Company.

Roller chain sprocket 45 and drive sprocket 22 are coaxially mounted on pin 44 and are engaged through the one way roller clutch 50 on the outside diameter of hub 48.

Pin 44 has radial oil holes 52 and a central oil hole or bore 53 blocked at one end by screw 54 and connected at the other end to a lubrication source.

The lubrication source has a cam ring 55 which is coaxially fastened to roller chain sprocket 45 by means of three tabs 56 bent over in corresponding holes of roller chain sprocket 45. Cam ring 55 is a sheet metal stamping with a stamped cam 57 which actuates a small piston 58 against a spring 59. As piston 58 moves back and forth in its bore, under spring force and cam action, it closes and uncovers fill port 60 which is connected to oil reservoir 61.

Oil reservoir 61 is formed by closing cavity 34 with a transparent cover 62 made of suitable plastic or other material. Cover 62 has an O-ring seal 63 on its periphery to seal cylindrical cavity 34 and an oil fill cap 64 with an integral rubber hearth valve 65 which lets air into the oil reservoir 61 as required without spilling oil. Cover 62 has molded cavities 66 and 67 connected by a molded passage 68.

Valve plate 69 and reed valve 70 have identical mating features, are maintained in position by four screws 71, and are sandwiched between cover 62 and cutting head 1. Hole 72 of valve plate 69 is connected to the pumping chamber of piston 58 and hole 73 to the central oil bore 53 of pin 44 by molded passage 68. Reed valve 70 is preferably formed from flexible gasket material such as Mylar or other suitable material and forms a part of gasket 70a. The reed valve portion of gasket 70a is connected to the pumping chamber of piston 58 and the other end of gasket 70a has a hole 74 aligned with hole 73 in valve plate 69 and central oil hole 53 of pin 44. The assembly of the foregoing components, in conjunction with cam ring 55, piston 58, and spring 59, comprises a low cost oil metering pump which is responsive to the lubrication requirement and operating mode of the invention.

Drive sprocket 22 has radial holes 75 between its teeth which intermittently align with the radial oil hole 52 of pin 44. When holes 52 and 75 are in alignment, oil is directly transferred to the cutting chain 21 which in turn lubricates chain bar 2.

In this manner, oil can be accurately metered to cutting chain 21 by proper selection of pump parameters, the number of cams 57, and the number of radial holes 75 in drive sprocket 22. Cover 62 functions as a cost effective oil level indicator.

MANUALLY POWERED EMBODIMENT OF THE INVENTION

The manually powered embodiment of the invention has all of the components previously identified and described except for the gasoline engine and its associated components, together with additional components of the invention described as follows:

Roller chain 76 is pinned to coupling 77 which connects roller chain 76 to rod 78. Rod 78 is housed in tubular member 79 having a bottom 80 at one end with a central hole through which rod 78 extends. The other end of tubular member 79 is inserted into cylindrical cavity 38 of cutting head 1 and clamped to it by screw 43. The free end of rod 78 is threaded into the frame of pulley assembly 81 and locked in place by nut 82.

The other end of roller chain 76, after being installed over roller chain sprocket 45, is attached to one end of extension spring 83. The other end of extension spring 83 is connected to rope 84, preferably made of nylon or other similar material.

The spring end of roller chain 76 with extension spring 83 and rope 84 is inserted into telescoping boom 3 so that rope 84 is threaded through the central hole of plug 85 which is fixed to one end of the inner tube member of telescoping boom 3.

The other end of the inner tube member of telescoping boom 3 is inserted into cylindrical cavity 39 of cutting head 1 and clamped to it by screw 43. The foregoing assembly is completed by applying a force to the free end of rope 84 equivalent to a predetermined spring preload force so that pulley assembly 81 is forced against bottom 80. At this point, a knot 86 is tied on the free end of rope 84 to secure the assembly.

The end of telescoping boom 3 is closed by cap 87 and screw 88. The outer member of telescoping boom 3 is free to move axially on the inner member until locked in a desired position by clamp 89, screw 90, and lock nut 91.

Pulley assembly 81 includes a U-shaped frame 93 closed by a cylindrical frame member 97 formed as a rivet. Pulleys 94 and 95 rotate independently from each other and are coaxially mounted within frame 93 on shaft or screw 96.

A second pulley assembly 98 is clamped to telescoping boom 3. Frame 99 of pulley assembly 98 is circular and fits over telescoping boom 3. Pulleys 100 and 101 of pulley assembly 98 are independently free to rotate and are coaxially mounted and clamped between frame 99 by screw 102 and nut 103. Pulley assembly 98 is clamped to the telescoping boom 3 by screw 104 and nut 105.

Actuator slide 106 has a tubular section 107 to which a forwardly pointing T-shaped block 108 is attached at the top. A flanged member 109 with a square protrusion 110 is attached to the bottom of actuator slide 106. Actuator slide 106 is preferably formed as a molded plastic part which fits over telescoping boom 3 and is free to move up and down on it.

Tubular section 107 is located between T-shaped blocks 108 on the top and flanged member 109 on the bottom and serves as a hand grip 111. Take-up reel 112 is rotatably attached to flanged member 109 by a flanged pilot 113 and screw 114. Actuating rope 115 is attached to pulley frame member 97 and looped around pulley assembly 81 and pulley assembly 98 at a desired length corresponding to the length of telescoping boom 3 when extended. Rope 115 is tied to T-shaped block 108 of actuator slide 106. The remaining free rope length is wound on take-up reel 112 and secured to it by a knot 116.

Pulleys 94, 95, 100, and 101 are used to gain mechanical advantage and to reduce the required input force. The looping of rope 115 as described above is preferable but other arrangements of rope 115 may be made which are operable also.

The operation of the manual embodiment of the invention is as follows to cut tree limb 7 which is close to horizontal in position, with cutting to begin at its top to avoid pinching of the saw.

Tension of cutting chain 21 has been adjusted as described above. The angle of chain bar 2 is adjusted by loosening clamping nut 32 and rotating chain bar 2 until it is positioned approximately at right angle to telescoping boom 3. Then, clamping nut or handle 32 is tightened to secure and complete the angular adjustment of chain bar 2.

The length of telescoping boom 3 is adjusted as desired by releasing rope 115 from T-shaped block 108 and loosening lock nut 91 on clamp 89, thereby freeing the telescoping boom 3 joint and permitting adjustment to the desired length. Lock nut 91 is then tightened, which locks the extended length of telescoping boom 3.

Then, the mechanical pruner is placed in position with cutting head 2 on limb 7. Actuator slide 106 is moved on boom 3 to a position comfortable for a hand pull by operator 9.

In this position of actuator slide 106, rope 115 is tied to T-shaped block 108.

The pruner is now operational. Operator 9 manually pulls on actuator slide 106 and thereby creates a tension force in rope 115 which is multiplied through pulley assemblies 81 and 98 and is transferred to rod 78, coupling 77, roller chain 76, and ultimately to spring 83 which is grounded at its other end by rope 84.

Since the tension force in rope 115 is greater than the spring force of spring 83, rod 78 moves downwardly until coupling 77 is stopped by bottom 80 of tubular member 79, thereby providing a power stroke 117.

When operator 9 terminates the manual pull on actuator slide 106, spring 83 returns the components actuated by the manual pull to their original starting position in readiness for the next power stroke.

Since roller chain 76 is connected to spring 83 and engaged in roller chain sprocket 45, the movement of roller chain 76 up and down will cause roller chain sprocket 45 to follow it with corresponding reversing rotary motion. The number of rotations of roller chain sprocket 45 is a function of power stroke 117.

The reversing rotary motion of roller chain sprocket 45 is converted into intermittent unidirectional rotary motion by one-way roller clutch 50 which is connected to drive sprocket 22 of cutting chain 21. During power stroke 117, the rotary motion of roller chain sprocket 45 will rotate cutting chain 21 and cut tree limb 7.

During the spring return stroke, cutting chain 21 remains stationary because one-way roller clutch 50 automatically disconnects and is unable to transfer power to drive sprocket 22 from roller chain sprocket 45.

Cutting chain 21 is lubricated by the action of the reversing rotary motion of roller chain sprocket 45 which carries cam ring 55 and actuates piston 58 in its bore against spring 59. As a result of the oscillating motion of piston 58 and the valve action described above, oil is intermittently pumped in metered quantities from oil reservoir 61 to the desired lubrication points.

MANUALLY POWERED HEDGE TRIMMER EMBODIMENT OF THE INVENTION

Twigs having a small diameter, below ½ inch, and leaves of a tree or hedge, cannot be efficiently cut by a chain saw but still need cutting. Accordingly, I have provided a modified embodiment of the invention by replacing chain bar 2, cutting chain 21, and chain bar carrier 25, with a hedge trimmer attachment.

The hedge trimmer attachment uses the intermittent rotary motion and other component parts described above for the manually powered embodiment of the invention as a pruner.

The hedge trimmer has a rotary cutting disc 118 with a plurality of cutting blades 119 preferably having sharpened concave leading edges 128 oriented forward in the direction of rotation. The blades 119 are distributed radially and preferably at equal distances around the periphery of disc 118. A plurality of saw teeth 120 are formed on the periphery of disc 118 between cutting blades 119.

The center of cutting disc 118 is a female image 121 of drive sprocket 22. Cutting disc 118 is axially positioned by spacer 122 on drive sprocket 22 and positively engages with the teeth of drive sprocket 22.

Washer 123 and screw 54 retain cutting disc 118 on pin 44. Rotary cutting disc 118 works in conjunction with stationary blade 124 which is attached to cutting head 1 by screw 43 and nut 125. Stationary blade 124 has a bent angle cross section 126 to increase blade stiffness. Stationary blade 124 is prevented from rotation by engaging into lip 127 of cutting head 1.

In assembly, stationary blade 124 and cutting disc 118 are in rubbing contact.

In operation, cutting edges 128 of cutting disc 118 and cutting edge 129 of stationary blade 124 face each other and provide efficient trimming of twigs and leaves of hedges.

The manually powered hedge trimmer modification of the invention uses the same elements for converting manual actuation into intermittent rotary output and for length adjustment as the previously described manually powered embodiment of the invention as a pruner.

Manual actuation causes the cutting disc 118 to rotate in the direction of orientation of its concavities. The curvature of cutting blades 119 catch and trap leaves and twigs and forces them against stationary blade 124, where they are cut. The grinding action of sawteeth 120 facilitates the cutting action by removing a portion of larger twigs before the twig to be cut is trapped between the cutting edges 128.

EMBODIMENT OF THE INVENTION HAVING VARIOUS POWER SOURCES

One of the unique features of the invention is to provide for various modifications thereof by deleting, rearranging and adding various components as necessary in combination to produce different models suitable for home owner or professional use in a cost effective manner.

Since there are many more power strokes with the use of a power source in a given unit of time than with manual actuation, the necessary revision and rearrangement of elements are primarily related to the shorter stroke and higher input speed produced by a power source.

Thus, roller chain 131 is shortened correspondingly to the reduced input stroke 130 and to reduce the reciprocating mass. One end of roller chain 131 is pinned to coupling 77 which in turn is pinned to rod 132. The other end of rod 132 is threaded and extends through a central hole of tubular stop or sleeve 133 which serves also as a guide for coupling 77. The threaded end of rod 132 is engaged into the thread of connector 136.

Rubber bumper 135 and washer 134 are bonded to connector 136.

When the above elements are assembled and inserted into cylindrical cavity 38 of cutting head 1, and roller chain 131 is engaged with roller chain sprocket 45, flange 137 of tubular stop or sleeve 133 will locate the assembled components in cutting head 1.

The free end of roller chain 131 is engaged into one end of return spring 138. The other end of spring 138 is attached to the far end of tubular housing 139 by pin 140.

Tubular housing 139 is slideably located in cylindrical cavity 39 of cutting head 1. Tubular housing 139 is pulled out of cylindrical cavity 39 with a predetermined length, thereby adjusting the required spring preload and forcing connector 136 against rubber bumper 135. Tubular housing 139 in its adjusted position, is locked to cutting head 1 by screw 43.

Actuating rope 142 is preferably a braided wire rope with minimal stretch under load. Other material may be used, provided it has the requisite capability of a braided wire rope (for example: solid music wire).

Minimal stretch under load for rope 142 is important and necessary because stretching the rope 142 reduces the effective output stroke. Although tolerable for manual operation due to the relatively long input stroke, stretching of rope 142 cannot be tolerated with a power source for the invention because when the stretch equals the input stroke, the output stroke becomes zero and no cutting action can take place.

One end of actuating rope 142 is engaged into the crosshole of flanged cylinder 143 and brazed to it. In turn, flanged cylinder 143 is engaged into the cross bore of connector 136 and secured in place by cotter pin 144. Actuating rope 142 is located inside telescoping boom 3 which is engaged into cylindrical cavity 38 of cutting head 1 and locked in place by screw 43. The coaxial sliding elements of telescoping boom 3 are positively locked to each other by pin 145. Pin 145 is welded to clamping screw 90 by bridge 146.

Clamp 89 is sandwiched between the head of clamping screw 90 and lock nut 91. Tightening of lock nut 91 provides additional clamping of telescoping boom 3. The length adjustment of telescoping boom 3 is in increments defined by the number of interlock holes in the inside sliding element. Interlocking of telescoping boom 3 is essential to avoid slip which would reduce the effective stroke of power head 5.

Power head 5 contains a cylinder 148 supported by bushings 149 and 150 on stationary flanged shaft 151. Cylinder 148 has a pivoting shaft 153 located off center by half of stroke 130 and parallel to flanged shaft 151. Pivoting shaft 153 is hollowed to reduce the unbalanced rotating mass and is supported on bushings 154 and 155.

Pivoting shaft 153 is retained in axial direction by integral shaft flange 156 and clamping flange 157 centered on the pilot or neck portion 158 of shaft 153. Cylinder 148 has lightening cavities 159, 160, and 161, and is preferably made of aluminum die casting material, although other suitable materials may be used provided they have comparable qualities.

Two steel balance weights 162 and 163 are located right and left from a geometric line connecting shaft centers 164 and 165 in the opposite half of cylinder 148, where pivoting shaft 153 is located. Drive gear 166 is preferably riveted to cylinder flange 167 by rivets 168, but other suitable methods of mounting may be used. Gear 166 as well as bushings 149, 150, 154, and 155 are preferably made of molded plastic to avoid the necessity of lubrication and to reduce cost, but any other suitable material having the requisite qualities of molded plastic may be used.

The cylinder assembly described above is mounted to main structure 152 by flanged shaft 151 and by axially retaining cylinder 148 between shaft flange 169 and main structure flange 170. Shaft 151 is pressed into the main structure 152 and cross doweled by dowel 171 for retention.

A suitable power source 6 is a gasoline engine 172 of a conventional type commonly used for weed trimmers, and modified by having a centrifugal clutch 173 to permit engine starting and idling without driving the rest of the apparatus of the invention. Centrifugal clutch 173 is needed to match the engine torque characteristics to the torque demand of the driven equipment. Although the centrifugal clutch is typically part of the engine assembly, it may be considered as part of the drive system for clarification.

Drive member 175 is connected to engine shaft 174 by threads on shaft 174 with a lead direction to tighten drive member 175 under load. Drive member 175 is engaged into two clutch shoes 176 and 177 pulled together and against drive member 175 by two springs 178 and 179.

Stamped steel clutch drum 180 is furnace brazed to a sintered steel pinion or gear 181 having a bushing 182. The brazed clutch drum assembly and drive member 175 together with clutch shoes 176 and 177 are coaxially mounted on the engine shaft 174 and retained on it by retaining ring 183.

In stationary condition, clutch shoes 176 and 177 are pulled against each other by springs 178 and 179, thereby providing a circular gap 184 between clutch shoes 176 and 177 and the freely mounted clutch drum assembly. If engine shaft 174 is turned by the starter, pinion or gear 181 remains stationary because the clutch elements are disconnected.

Centrifugal clutch 173 remains disconnected until a speed is reached at which the centrifugal force generated by clutch shoes 176 and 177 overcomes the preload of springs 178 and 179. With a further increase in speed, clutch shoes 176 and 177 move out, thereby eliminating circular gap 184, and frictionally engage clutch drum 180. The torque capacity of centrifugal clutch 173 is a function of speed but it is limited by the friction coefficients of the mating materials which make clutch 173 an effective overload protection device.

Gasoline engine 172 with centrifugal clutch 173 attached to engine shaft 174 is mounted to the main structure or housing 152 by screws 185, 186, 187 and 188.

Sintered steel pinion or gear 181 engages drive gear 166 and has considerably fewer teeth than cylinder drive gear 166 which results in proportionately reduced rotational speed of cylinder 148 and proportionately increased torque of cylinder 148.

The drive elements are housed in a frame structure 189 which is fastened to the main structure 152 by screws 190. Seal 191 in frame structure 189 rotatably seals cylinder 148, thereby preventing dust from entering into frame structure 189 as well as preventing lubricant from leaking out when used. Frame structure 189 also structurally connects power head 5 to telescoping boom 3 and supports two rope guide pulleys 192 and 193.

One end of telescoping boom 3 is attached to cutting head 1 as previously described. The opposite and of telescoping boom 3 is clamped to frame structure 189 by cover 194 and screws 196 and 197 which are engaged in nuts 198 and 199. Cover 194 has a lock button 195 which is engaged into a mating hole in telescoping boom 3 to prevent axial disengagement and to positively orient the components of telescoping boom 3.

Rope guide pulleys 192 and 193 are located or sandwiched between frame structure 189 and cover 194 and have semi circular grooves 200 and 201 on their outer diameters. The rope guide pulleys 192 and 193 are mounted as a pair tangent to each other to form a circle 202 which is coaxial with telescoping boom 3. Screws 203 and 204 serve as shafts for rope guide pulleys 192 and 193 and are engaged into nuts 205 and 206, thereby clamping the bearing inner races 207 and 208 between frame structure 189 and cover 194, and adding stiffness and strength to the joint of frame structure 189 and cover 194. The arrangement of rope guide pulleys 192 and 193 provides a unique low friction arrangement as used in connection with the crank mechanism defined by cylinder 148.

Actuating rope 142 is attached to pivoting shaft 153 when it is in top dead center positon. To assure a positive attachment without slip, actuating rope 142 is looped between pins 209, 210, 211, and 212, and the central post 213 of pivoting shaft 153. Pins 209, 210, 211, and 212 are pressed into clamping flange 157.

To increase the loop generated friction, the loop of actuating rope 142 is located or sandwiched between clamping flange 157 and clamping washer 214, which have mating clearance holes at the location of pins 209, 210, 211, and 212. Clamping flange 157 and clamping washer 214 are forced together by clamping nut 215, thereby by establishing a positive joint between pivoting shaft 153 and actuating rope 142 at any point along actuating rope 142 which corresponds to the adjusted length of telescoping boom 3.

Storage of inactive actuating rope 216 is provided by storage reel 217 located in cavity 218 of main structure 152. Storage reel 217 is preferably made of molded plastic but any other suitable material may be used. Storage reel 217 contains a clock spring 219 which is biased to take up the length of inactive actuating rope 216 extending from clamping disc 157.

Shaft 220 is stationary and is blocked from rotation by a flat cut out portion 221 engaging into a mating surface of main structure or housing 152. The other end of shaft 220 is supported by a washer 222 and a sheet metal cover 223, which is attached to the main structure or housing 152 by screws 224.

Clock spring 219 is located in the central cavity of storage reel 217. One end of clock spring 219 is attached to the periphery 225 of the central cavity of storage reel 217 and the other end of clock spring 219 is attached to grounded shaft 220.

The spring biased storage reel 217 automatically readjusts the length of actuating rope 142 when it is released from clamping flange 157 and the telescoping boom 3 is readjusted. A manually operated storage reel may be used instead of the spring biased storage reel 217 and will be equally functional but not as convenient.

Inactive actuating rope 216 enters reel cavity 218 through opening 226 by forming a bend or loop 227 between storage reel 217. and clamping flange 157 to the extent permitted by storage reel 217 Opening 226 is lined by a Teflon insert 228 to prevent rope damage as bend of loop 227 whips around due to the orbital motion of pivoting shaft 153.

Rubber bumper 229 is attached by screws 230 to the bottom of frame structure 189 to protect power head 5 from damage in handling it or supporting it on the ground. A spring biased hinged access cover 231 encloses all moving parts to protect operator 9 or bystanders from orbiting clamping flange 157 and whipping loop or bend 227. Access cover 231 can be folded away when necessary to adjust the length of actuating rope 142.

Engine control 10 is preferably mounted on telescoping boom 3 so that both hands are available to maneuver the invention while maintaining control over the cutting action. Other control arrangements may be used such as integrated controls in some engines.

The use of gasoline engine 172 to power the invention is primarily for professional operators requiring total mobility. For home owner use, an electric motor 233 is more practical, being easier to operate and having a lower cost than gasoline engine 172.

Power head 5 has a unique feature in its design such as to allow substitution of electric motor 233 for gasoline engine 172 without making internal changes. Thus, electric motor 233 is attached to main structure or housing 152 by screws 234, 235, 236, and 237.

Although numerous varieties of suitable commercial electric motors are available for use in the present invention, any such motor must have a bearing 238 next to pinion or gear 239 which has identical gear data or ratios to pinion or gear 181 used for the gasoline engine powered embodiment of the invention. Electric motor 233 preferably should have a cooling fan 240 and should provide for a brake drum 241.

A preferred location for control of electric motor 233 is on telescoping boom 3 but integrated control 242 is an acceptable alternative.

The invention provides maximum common parts for embodiment of the invention that are powered manually, by a gasoline engine, or by an electric motor, thereby permitting volume production and relatively low costs.

In operation with a power source 6, for the invention, the action of cutting head 1 remains the same as a tree pruner or as a hedge trimmer that is manually operated. The primary difference between the manually operated embodiment of the invention from the power operated embodiment of the invention is the relatively slow and long input strokes of the manually operated embodiment, whereas the powered embodiments have a relatively short and rapid input stroke.

The high rotary input speed and low torque of power source 6 is converted into reduced rotary output speed and increased torque by the gear reduction of pinion or gear 181 and drive gear 166 according to known mathematical relationships.

The reduced rotary output speed of cylinder 148 is converted into reciprocating motion by pivoting shaft 153 which is rotatively mounted on bushings 154 and 155 in cylinder 148 and located off center by half the stroke 130 and parallel to the rotational axis of cylinder 148. Thus, pivoting shaft 153 orbits around the rotary axis of cylinder 148. The overhanging end of pivoting shaft 153 is attached to actuating rope 142 which in turn is connected to roller chain 131 through various coupling elements.

Roller chain 131 is engaged into roller chain sprocket 45 which is the input drive to cutting head 1 and its free end is attached to return spring 138. The installed preload of spring 138 keeps actuating rope 142 under tension when pivoting shaft 153 is at its top dead center.

From this position, pivoting shaft 153 starts its orbit and pulls actuating rope 142 with it when cylinder 148 is rotated. By doing so, pivoting shaft 153 pivots in its bushings 154 and 155 and remains aligned with the directional pull of actuating rope 142 dictated by rope guide pulleys 192 and 193.

One half turn of cylinder 148 represents a power stroke 130 when power is delivered to roller chain sprocket 45 from power source 6 to be converted again to rotary motion in cutting head 1, thereby performing useful work and storing energy into return spring 138.

During the following half-turn of cylinder 148, no power is delivered to cutting head 1 because any delivery of power is disconnected by one-way roller clutch 50.

Cutting head 1 receives stored power from return spring 138 until returned to its starting position.

Rope guide pulleys 192 and 193 prevent excessive rope whip that may develop above certain speeds, and insure that a strictly axial rope pull is transferred to the coupling elements of roller chain 131.

The above described operation is repeated as a function of the rotational speed of cylinder 148, thereby resulting in a unidirectional intermittent rotary output at cutting head 1 regardless of the direction in which power source 6 rotates.

EMBODIMENT OF THE INVENTION WITH SAFETY OPTIONS

The invention may be provided with a safety option comprising a top chain guard 243 which is a blade-like member, considerably thinner than the cut produced by the pruner, and having a generally convex periphery. The chain guard 243 is stationary and is secured to chain bar carrier 25 by support bracket 244 in conjunction with screws 245.

The purpose of top chain guard 243 is to prevent the top of cutting chain 21 from touching a branch and kicking chain bar 2 back in the event of improper operation of the invention.

The invention may be further provided with an additional safety option to render operation of the invention foolproof by preventing operation of the invention if top chain guard 243 should be removed.

To prevent operation of the invention by removal of top chain guard 243, chain tension adjustment is incorporated with top chain guard 243 as follows.

The front portion of top chain guard 243 is formed with a boss 246 which supports a threaded yoke 247 in conjunction with a threaded pin or spindle 248 and adjusting nut 249. Yoke 247 is fastened to chain bar 2 by cross bolt 250 and nut 251.

When adjusting nut 249 is turned as desired, it pulls on chain bar 2, thereby adjusting the tension to the desired point. Chain bar clamping screw 28 is tightened to fix the position of chain bar 2. Thus, top chain guard 243 and yoke 247 protect the top and front upper nose quadrant of chain bar 2 which produces kickback. Yoke 247 also blocks kickback in the horizontal direction because it is wider than the cut being made by the invention.

If top chain guard 243 is removed, tensioning means of cutting chain 21 would also be removed, thereby preventing any cutting action of the invention.

Although I have described the invention in detail with reference to the accompanying drawings illustrating preferred embodiments of the invention, it is understood that numerous changes may be made in the details of construction and arrangement of parts without departure from the spirit and scope of the invention as hereinafter claimed.

I claim:

1. A portable apparatus for pruning tree limbs, comprising:
    a cutting head having a chain bar mounted on a chain bar carrier with a chain saw driven by a drive sprocket and having a central hole and a cavity for receiving and holding oil;
    means for angular adjustment of said chain bar to an infinite plurality of rotary positions relative to said cutting head;
    means contained in said cutting head for metering oil to lubricate said chain saw during the cutting of a tree limb;
    means for providing intermittent unidirectional rotary motion to said drive sprocket;
    blocking member means contacting a tree limb during the cutting operation of said apparatus and generating an equal and opposite reaction to the cutting forces generated by said cutting head; and
    safety means mounted on said chain bar carrier and rendering the cutting operation of said apparatus inoperable upon removal of said safety means.

2. A portable apparatus for pruning tree limbs according to claim 1 in which said means for angular adjustment of said chain bar comprises:
    means clamping said chain bar to said chain bar carrier;
    a circular member formed on the periphery of said chain bar carrier and located between yoke means and a portion of said cutting head; and
    adjustable clamping means clamping said circular segment of said chain bar carrier to an infinite rotary position relative to said cutting head.

3. A portable apparatus for pruning tree limbs according to claim 1 in which said means contained in said cutting head for metering oil to lubricate said chain saw during the cutting of a tree limb comprises:
    a cover enclosing said cavity of said cutting head and having a passageway formed in its inner surface;
    a fill port connected to said cavity of said cutting head;
    valve means for letting air into said cavity as required, without spilling oil;
    a pin member pressed into said central hole of said cutting head and having a central oil bore closed at its outer end and provided with radial oil holes in intermittent alignment with radial holes formed in said drive sprocket, said drive sprocket and said roller chain sprocket coaxially mounted on said pin;
    a cam ring member coaxially fastened to said roller chain sprocket and having a cam that actuates a piston against a spring in a pumping chamber to close and open said fill port;
    reed valve means located at the outer end of said pumping chamber and mounted in position between said cover and said cutting head by a valve plate having a hole connected to said pumping chamber and having another hole connected to said central oil bore of said pin member of said passageway of said cover.

4. A portable apparatus for pruning tree limbs according to claim 1 in which said means for providing intermittent unidirectional rotary motion to said drive sprocket comprises:
    a central hub formed in said cutting head and having a central hole therein which receives a pin member;
    a tubular extension formed on said drive sprocket and which receives a one-way roller clutch;
    a roller chain sprocket having a hub portion and coaxially mounted with said drive sprocket on said pin and engaged through said one-way roller clutch on the outside diameter of said hub portion of said roller chain sprocket;
    telescoping boom means having an axially movable outer member and an inner member having a top end inserted in a cavity of said cutting head and clamped to said cutting head;
    means for locking said outer member of said telescoping boom means on said inner member of said telescoping boom means to maintain a desired extended length of said telescoping boom means;
a roller chain installed on said roller chain sprocket and having one end connected to the top end of a rod member having its bottom end connected to a pulley assembly fastened to the top end of an actuating rope member secured to an axially movable slide member mounted on said outer tubular member of said telescoping boom means, said roller chain having its other end connected to an extension spring fastened to a rope member having its lower end secured to the bottom of said inner member of said telescoping boom means.

5. A portable apparatus for pruning tree limbs according to claim 1 in which said blocking member means comprises:
a blocking member formed from the lower portion of said chain guard carrier and having a vertical edge tangent to the circumference of the tree limb to be cut.

6. A portable apparatus for pruning tree limbs according to claim 1 in which said safety means comprises:
a top chain guard mounted on said chain bar carrier and having its front portion provided with a threaded boss member;
a spindle threaded into said boss member;
a yoke member connected at one end to said chain bar and connected at its other end to the head portion of said spindle, and
adjusting nut means threaded on the outer portion of said spindle for adjusting the tension of said chain saw; whereby
removal of said top chain guard renders the cutting operation of said apparatus inoperable by removing tension of said chain saw.

7. A power operated portable apparatus for pruning tree limbs, comprising:
a cutting head having a chain bar mounted on a chain bar carrier with a chain saw driven by a drive sprocket and having a central hole and a cavity for receiving and holding oil;
means for angular adjustment of said chain bar to an infinite plurality of rotary positions relative to said cutting head;
means contained in said cutting head for metering oil to lubricate said chain saw during the cutting of a tree limb;
means for providing intermittent unidirectional rotary motion to said drive sprocket;
blocking member means contacting a tree limb during the cutting operation of said apparatus and generating an equal and opposite reaction to the cutting forces generated by said cutting head; and
safety means mounted on said chain bar carrier and rendering the cutting operation of said apparatus inoperable upon removal of said safety means.

8. A power operated portable apparatus for pruning tree limbs, according to claim 7, in which said means for providing intermittent unidirectional rotary motion to said drive sprocket comprises:
a central hub formed in said cutting head and having a central hole therein which receives a pin member;
a tubular extension formed on said drive sprocket and which receives a one-way roller clutch;
a roller chain sprocket having a hub portion and coaxially mounted with said drive sprocket on said pin and engaged through said one-way roller clutch on the outside diameter of said hub portion of said roller chain sprocket;
a housing having its top end inserted into a cavity of said cutting head and locked in its inserted position by locking means;
a return spring member inserted in said housing and having its bottom end attached to the bottom end of said housing;
a roller chain installed on said roller chain sprocket and having one end connected to the top end of said return spring and having its other end connected to the top end of a rod member with the bottom end of said rod member connected to the top end of an actuating rope member;
a rotatable cylinder supported by bushings on a stationary flanged shaft in a power head, said cylinder having a pivoting shaft located off center on bushings and orbiting around said rotatable cylinder and having a neck portion provided with clamping means clamping the lower portion of said actuating rope member to said neck portion of said pivoting shaft;
a drive gear member mounted on a flange formed on the periphery of said rotatable cylinder and engaged by pinion means mounted on the engine shaft of said power source, and
a pair of rope guide pulleys tangent to each other and supported by a frame structure housing said power head, and having said actuating rope member inserted between said rope guide pulleys.

9. In a portable apparatus for pruning tree limbs which includes a cutting head provided with a chain bar carrier having a chain bar with a chain saw driven by a drive sprocket,
the improvement of infinite rotary adjustment in position of said chain bar carrier together with said chain bar and chain saw, relative to said cutting head, comprising:
means for clamping said chain bar to said chain bar carrier;
a circular member formed on the periphery of said chain bar carrier and located between yoke means and a portion of said cutting head; and
adjustable clamping means clamping said circular segment of said chain bar carrier to an infinite rotary position relative to said cutting head.

10. In a power operated portable apparatus for trimming hedges which includes a cutting head having a drive sprocket on which a hedge trimming disc is mounted,
the improvement of transmission means for providing intermittent unidirectional rotary motion to said drive sprocket and to said hedge trimming disc produced by a pulling force transmitted from a power source, comprising:
a central hub formed in said cutting head and having a central hole therein which receives a pin member;
a tubular extension formed on said drive sprocket and which receives a one-way roller clutch;
a roller chain sprocket having a hub portion and coaxially mounted with said drive sprocket on said pin and engaged through said one-way roller clutch on the outside diameter of said hub portion of said roller chain sprocket;
a housing having its top end inserted into a cavity of said cutting head and locked in its inserted position by locking means;

a return spring member inserted in said housing and having its bottom end attached to the bottom end of said housing;

a roller chain installed on said roller chain sprocket and having one end connected to the top end of said return spring and having its other end connected to the top end of a rod member with the bottom end of said rod member connected to the top end of an actuating rope member;

a rotatable cylinder supported by bushings on a stationary flanged shaft in a power head, said cylinder having a pivotal shaft located off center on bushings and orbiting around said rotatable cylinder and having a neck portion provided with clamping means clamping the lower portion of said actuating rope member to said neck portion of said pivoting shaft;

a drive gear member mounted on a flange formed on the periphery of said rotatable cylinder and engaged by pinion means mounted on the engine shaft of said power source.

11. In a portable apparatus for pruning tree limbs and having a cutting assembly with a chain saw driven by a drive sprocket, the improvement of self-contained means located in said cutting assembly for lubrication of said chain saw, comprising:

a cutting head located within said cutting assembly and having a central hole and a cavity for receiving and holding oil;

a cover enclosing said cavity of said cutting lead and having a passageway formed in its inner surface;

a fill port connected to said cavity of said cutting head;

valve means for letting air into said cavity as required without spilling oil;

a roller chain sprocket actuating said drive sprocket by rotary motion produced by transmission of a pulling force on the roller chain of said roller chain sprocket from a source of power;

a pin member pressed into said central hole of said cutting head and having a central oil bore closed at its outer end and proveded withradial oil holes in intermittent alignment with radial holes formed in said drive sprocket, said drive sprocket and said roller chain sprocket coaxially mounted on said pin;

a cam ring member coaxially fastened to said roller chain sprocket and having a cam that actuates a piston against a spring in a pumping chamber to close and open said fill port;

reed valve means located at the outer end of said pumping chamber and mounted in position between said cover and said cutting head by a valve plate having a hole connected to said pumping chamber and having another hole connected to said central oil bore of said pin member by said passageway of said cover;

whereby oil is metered to said chain saw during the cutting of a tree limb by said portable apparatus.

12. In a portable apparatus for pruning tree limbs and having a cutting assembly with a chain saw driven by a drive sprocket actuated by rotary motion of a roller chain sprocket produced by transmission of a pulling force on the roller chain of said roller chain sprocket from a source of power, the improvement of self-contained means located in said cutting assembly for lubrication of said chain saw, comprising:

a cutting head located within said cutting assembly and having a central hole and a cavity for receiving and holding oil;

a cover enclosing said cavity of said cutting head and having a passageway formed in its inner surface;

a fill port connected to said cavity of said cutting head;

valve means for letting air into said cavity as required without spilling oil;

a pin member pressed into said central hole of said cutting head and having a central oil bore closed at its outer end and provided with radial oil holes in intermittent alignment with radial holes formed in said drive sprocket, said drive sprocket and said roller chain sprocket coaxially mounted on said pin;

a cam ring member coaxially fastened to said roller chain sprocket and having a cam that actuates a piston against a spring in a pumping chamber to close and open said fill port;

reed valve means located at the outer end of said pumping chamber and mounted in position between said cover and said cutting head by a valve plate having a hole connected to said pumping chamber and having another hole connected to said central oil bore of said pin member by said passageway of said cover;

whereby oil is metered to said chain saw during the cutting of a tree limb by said portable apparatus.

13. In a power operated portable apparatus for pruning tree limbs which includes a cutting head having chain bar means with a chain saw driven by a drive sprocket, the improvment of transmission means for providing intermittent unidirectional rotary motion to said drive sprocket and to said chain saw produced by a pulling force transmitted from a power source, comprising:

a central hub formed in said cutting head and having a central hole therein which receives a pin member;

a tubular extension formed on said drive sprocket and which receives a one-way roller clutch;

a roller chain sprocket having a hub portion and coaxially mounted with said drive sprocket on said pin and engaged through said one-way roller clutch on the outside diameter of said hub portion of said roller chain sprocket;

a housing having its top end inserted into a cavity of said cutting head and locked in its inserted position by locking means;

a return spring member inserted in said housing and having its bottom end attached to the bottom end of said housing;

a roller chain installed on said roller chain sprocket and having one end connected to the top end of said return spring and having its other end connected to the top end of a rod member with the bottom end of said rod member connected to the top end of an actuating rope member;

a rotatable cylinder supported by bushings on a stationary flanged shaft in a power head, said cylinder having a pivoting shaft located off center on bushings and orbiting around said rotatable cylinder and having a neck portion provided with clamping means clamping the lower portion of said actuating rope member to said neck portion of said pivoting shaft;

a drive gear member mounted on a flange formed on the periphery of said rotatable cylinder and engaged by pinion means mounted on the engine shaft of said power source, and a pair of rope guide pulleys tangent to each other and supported by a frame structure housing said power head, and having said actuating rope member inserted between said rope guide pulleys.

14. The improvement according to claim 13 in which said actuating rope member is a solid music wire with minimal stretch under load.

15. The improvement according to claim 13 in which said actuating rope member is a wire braided rope with minimal stretch under load.

16. The improvement according to claim 13 in which said actuating rope member is contained in a telescoping boom means adjustable in length and is adjustable to correspond to the adjusted length of said telescoping boom means in conjunction with a storage reel means located in the housing of said power source, said storage reel being provided with a spring biased to take up the inactive length of said actuating rope member.

17. In a portable apparatus for pruning tree limbs which includes a cutting assembly having a chain bar with a chain saw under tension and driven by a drive sprocket, the improvement of safety means rendering the cutting operation of said apparatus inoperative upon removal of said safety means, comprising:

a top chain guard mounted on the carrier of said chain bar and having its front portion provided with a boss member;

means for adjusting the tension of said chain saw connected to said boss member and to said chain bar;

whereby removal of said top chain guard renders the cutting operation of said apparatus inoperable.

18. In a portable apparatus for pruning tree limbs which includes a cutting assembly having a chain bar with a chain saw under tension and driven by a drive sprocket, the improvement of safety means rendering the cutting operation of said apparatus inoperative upon removal of said safety means, comprising:

a top chain guard mounted on the carrier of said chain bar and having its front portion provided with a threaded boss member;

a spindle threaded into said boss member;

a yoke member connected at one end to said chain bar and connected at its other end to the head portion of said spindle, and adjusting nut means threaded on the outer portion of said spindle for adjusting the tension of said chain saw; whereby removal of said top chain guard renders the cutting operation of said apparatus inoperable by removing tension of said chain saw.

* * * * *